United States Patent

Medlock

[11] Patent Number: 5,207,277
[45] Date of Patent: May 4, 1993

[54] AGRICULTURAL HARVESTER

[76] Inventor: Harold G. Medlock, Box 7514 U.S. Hwy. 85, Fort Lufton, Colo. 80621-8824

[21] Appl. No.: 860,791

[22] Filed: Mar. 30, 1992

[51] Int. Cl.⁵ .................... A01D 23/04; A01D 27/00
[52] U.S. Cl. .................................. 171/38; 56/327.1; 171/36
[58] Field of Search ........... 56/121.41, 121.42, 121.43, 56/121.44, 121.46, 327.1; 171/31, 36, 38

[56] References Cited

U.S. PATENT DOCUMENTS

| Re. 19,672 | 8/1935 | Malcom et al. | |
|---|---|---|---|
| 721,496 | 2/1903 | Bartlett | 171/38 |
| 894,262 | 7/1908 | Ellinwood | |
| 1,067,378 | 7/1913 | Shane | 171/38 |
| 1,086,631 | 2/1914 | Weaver | 171/38 |
| 1,439,187 | 12/1922 | Pocock | 171/38 X |
| 2,525,018 | 8/1946 | Corwin | |
| 2,625,781 | 1/1953 | Tateyama | 171/38 X |
| 2,833,357 | 5/1958 | Lust | 171/38 X |
| 4,629,005 | 12/1986 | Hood, Jr. et al. | 56/327.1 X |

FOREIGN PATENT DOCUMENTS 3338563 7/1984 Fed. Rep. of Germany .

*Primary Examiner*—George A. Suchfield

[57] ABSTRACT

A bulb harvester with structure for lifting foliage attached to bulbs for presentation to an upper set of rotatably supported belts affixed to define a first foliage receiving crack. The first receiving crack is narrow for tightly gripping foliage attached to a bulb. The upper set of belts are positioned at a divergent angle relative to the ground. With rotation of the upper set of belts, gripped foliage with an attached bulb is drawn upward from the ground due to the divergent angle and transported toward the rear of the harvester. A lower set of elongated members define a second foliage receiving crack positioned below the first receiving crack to allow the first and second foliage receiving cracks to simultaneously possess the foliage of a bulb with the bulb positioned below a bottom plane of the lower set of elongated members. The upper set of belts are placed at a divergent angle relative to the lower set of elongated members to place the upper set of belts closer to the lower set of elongated members near the foliage lifting structure. The bottom plane of the lower set of elongated members provides an abutment surface for a bulb to abut against when drawn upward from the ground by the divergent angle of the upper set of belts with the abutting properly positioning the bulb prior to the cutting of the foliage from the bulb by cutting wheels.

20 Claims, 15 Drawing Sheets

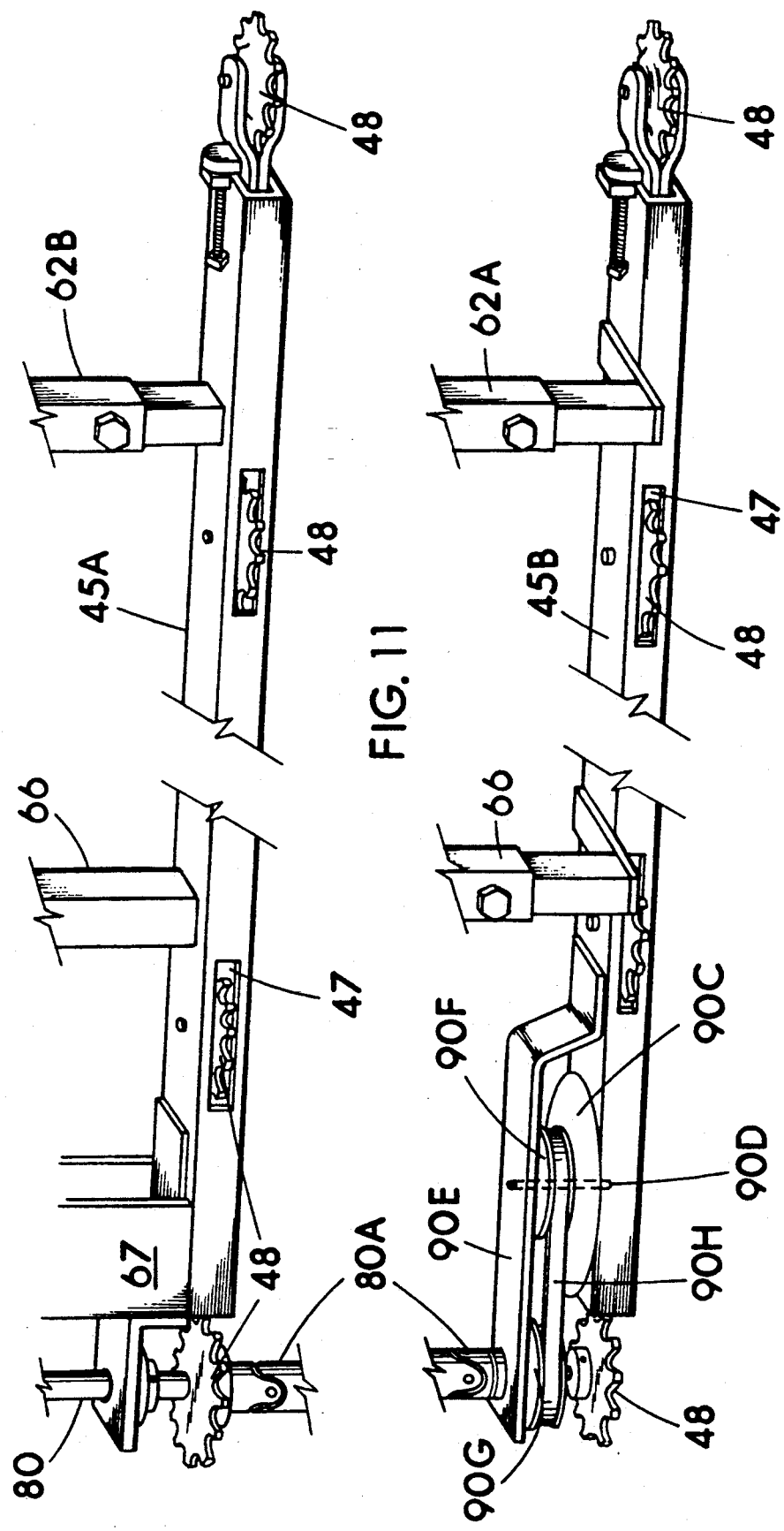

AGRICULTURAL HARVESTER

BACKGROUND OF THE INVENTION

1. Field of the Invention

This invention relates to agricultural crop harvesting machinery. More particularly the invention relates to a crop harvester of the type which may be moved along the ground to extract bulbous crops such as onions from the ground. In one embodiment, the harvester may be towed by a tractor, and in a second or alternative embodiment the harvester is self-propelled having an attached internal combustion engine.

2. Description of the Prior Art

A prior art search was conducted at the U.S. Patent and Trademark Office to examine crop harvesting machinery which might be similar to that of this disclosure. None of the related crop harvesting machines found in the prior art search are structured the same as my harvester, and none are believed to offer comparable harvesting efficiencies and benefits for the same crops when compared to the harvester described in this disclosure by way of example.

Some of the problems existing in related prior art harvesters which I believe I have solved with my invention include, but are not limited to: the undesirable bruising, cutting or nicking of the bulbs; the complete inability to cut-off the top foliage (leaves) and or bottom roots of the bulbs existing in some prior art harvesters; or in those prior art harvesters which can also cut-off the foliage and or roots, the problem of predictably and consistently cutting-off the foliage or the bottom roots at the proper location relative to the bulbs. A further problem is speed of harvesting, which probably will always exist since faster harvesting is generally more economical, and the industry will always be seeking faster harvesters.

SUMMARY OF THE INVENTION

In practicing my invention, I have structured a harvester which was initially built to harvest bulb type onions. It should be noted that although I initially built my harvester for bulb onions, the structures and principles of my harvester are clearly not limited to use in a harvester exclusively for onions. It should be realized other similar crops such as turnips, beets, radishes, rutabagas, garlic and possibly some other bulb vegetables, and flower bulbs could be harvested with a harvester structured in accordance with the present invention.

My harvester is structured to quickly harvest vegetable or flower bulbs of the type which are positioned close to the ground surface, and which include top foliage at the time of harvest. Such crops are normally grown in long straight rows, and the rows are often mounded rows, often with each elongated mound having two or more parallel crop rows extending the length of the mound.

My harvester includes multiple stages which include, but are not limited to: a foliage lifting and positioning stage. The foliage lifting and positioning stage is accomplished with a set of juxtaposed rotating chains with extending rake-like rubbery fingers positioned divergent to the ground, and is followed by a bulb lifting and positioning stage. The bulb lifting and positioning stage is accomplished by a upper set of juxtaposed rotating belts positioned for pinching or gripping foliage, and the upper belts are further positioned both divergently angled to the ground and divergent to a lower set of juxtaposed rotating belts. The rotating lower belts provide an abutment surface for the bulbs to abut when drawn upward. The abutment of the bulbs against the bottom plane of the lower set of juxtaposed rotating belts prepositions the bulbs with attached foliage prior to being passed into a foliage cutting structure at the rear of the harvester for severing the foliage from the bulbs.

Possible additional stages may include removal of fine roots sometimes present at the bottom end of certain bulbs such as onions, and a bagging or boxing arrangement for placing the bulbs into containers after the other stages.

A harvester in accordance with the present invention is capable of traveling along a crop row, and gently and quickly extracting the bulbous crop from the ground without damaging the bulbs. The foliage cutting structure in combination with the abutment surface provided by the two juxtaposed lower belts provides an arrangement for precisely cutting the leafy tops of the bulbs at an acceptable and consistent location relative to the bulbs. The location for cutting the foliage from the bulbs is also preferably adjustable in order to accommodate bulbs of various size ranges in different fields with the same harvester. The leafy tops or foliage may be cut-off and dropped back onto the ground.

Additionally, although a harvester structured in accordance with the present invention may be built to harvest only one crop row at a time, it may be structured to harvest multiple rows in a signal pass for increased economics of harvesting.

Furthermore, a harvester structured in accordance with the present invention may be built to either deposit both the cut foliage and bulbs back onto the ground to be picked up in a separate process, or the bulbs may be deposited onto a conveyor system or the like for placement in suitable containers such as bags, boxes or the like. A bagging or boxing arrangement may be built as an integral part of the harvester, or structured as a towable unit behind the harvester, whether the harvester is self-propelled or towable behind a tractor.

It is therefore a primary object of my invention to provide an improved mechanical harvester structured to quickly extract bulbous crops from the ground in a manner which causes little or no damage to the bulbs.

It is a further object of my invention to provide the above in a harvester which additionally includes capabilities for cutting-off the top foliage of the bulbs, and further wherein the location of cutting is predictable with a very low failure rate.

It is a further object of my invention to provide the above in a harvester wherein the cut-off location of the top foliage from the bulbs is adjustable in order to accommodate various size ranges of bulbs which may exist in different fields.

It is a further object of my invention to provide the above in a harvester which may optionally include capabilities for cutting-off the bottom roots of the bulbs.

It is an even further object of my invention to provide the above in a harvester which harvests the bulbs and cuts-off the foliage, and additionally cuts the roots if desired, separates the cut foliage and roots from the bulbs and then places the bulbs into containers, and further to do this very quickly so as to allow the harvest of a large volume in a short period of time with little manual labor and little or no damage to the bulbs.

These objects along with many other objects, advantages, and principles of my invention will be better understood by those skilled in the art with a reading of the remaining specification and by examination of my drawings of structural embodiments of the invention shown and described for example. The ensuing drawing figure descriptions of the appended drawings, and the Best Mode for Carrying Out the Invention are illustrative and descriptive of structures and principles which may be incorporated in a number of slightly different suitable harvester structures all in accordance with the present invention. The drawings and written description are given only for example in order to allow those skilled in the art to be able to both build and use at least one harvester in accordance with the present invention, and are not to limit the scope of the invention only to the specific structural embodiments shown and described.

BRIEF DESCRIPTION OF THE DRAWINGS

FIG. 11 is a view of a typical upper belt support member (rectangular tube) having additional affixed components relative to the FIG. 7 drawing;

FIG. 12 is a view of a typical lower belt support member (rectangular tube) having additional affixed components relative to the FIG. 7 drawing;

BEST MODE FOR CARRYING OUT THE INVENTION

Figure 1:
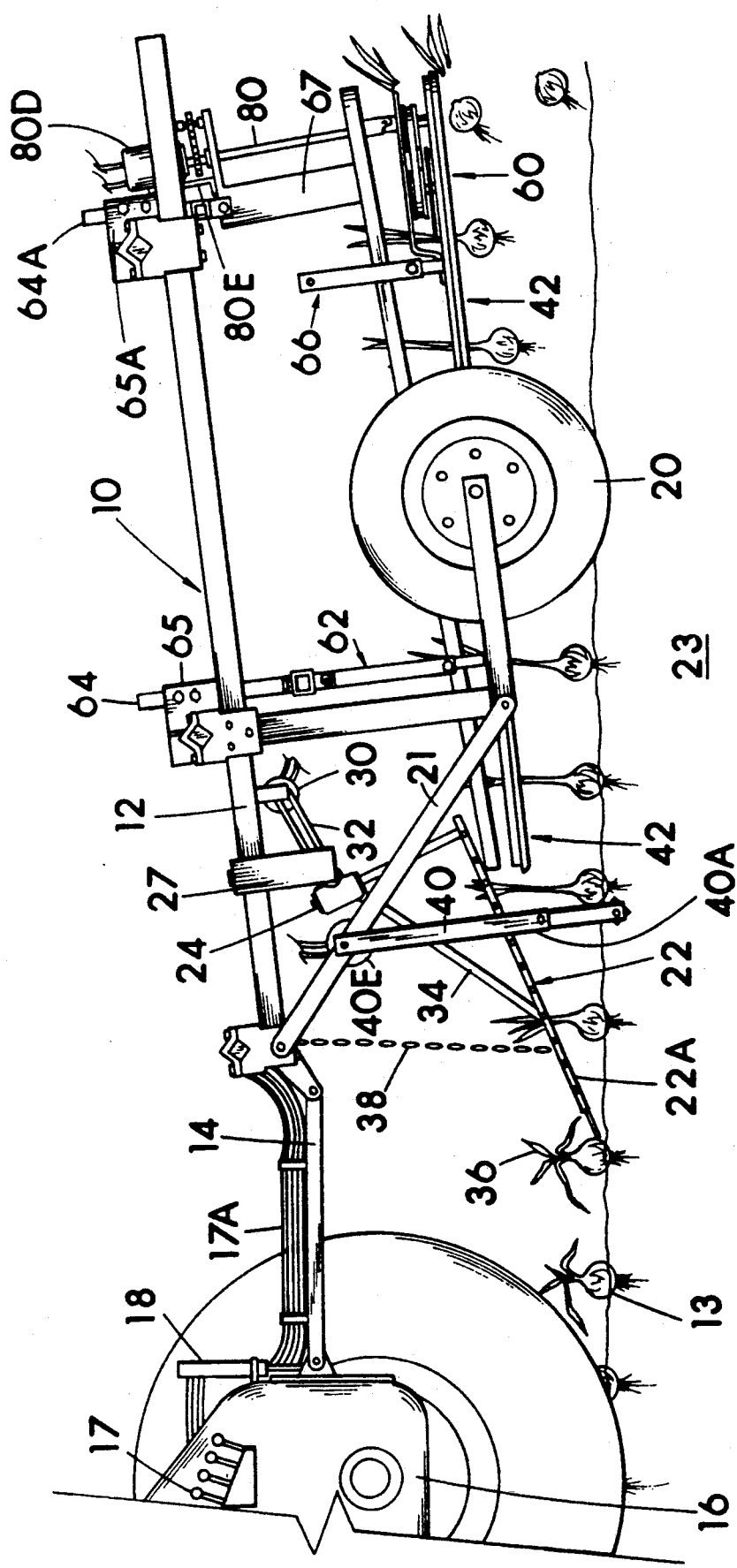
FIG. 1 is a side view of a first embodiment of my harvester, which is a towable harvester embodiment shown being towed along the ground through an onion field by a tractor. Only a portion of the rear end of the tractor is shown as tractors are very well known, and the harvester is in the process of extracting bulb onions from the ground and cutting-off the top foliage. The optional bagging or boxing arrangement, and the optional bottom root cutting arrangement is not shown in this view.

Referring now to drawing FIGS. 1-18 in general, and particularly to FIG. 1 where my towable first embodiment harvester 10 is shown in a side view. The second harvester embodiment 200 shown in FIG. 18 is a self-propelled harvester also structured in accordance with the present invention and having the optional root cutting arrangement 92, and conveyor and boxing arrangement attached thereto. This self-propelled embodiment of the harvester is essentially the same as that of the towable first embodiment 10 with the addition of the necessary equipment to this harvester to eliminate the need for the towing tractor.

First embodiment harvester 10 in this example is an embodiment structured to harvest two parallel rows of bulbs at once, but this is only to exemplify multiple row harvesting capabilities as harvester 10 could just as easily be structured to harvest only one row of bulbs at a time, or three or more rows of bulbs at a time. Harvester 10 in some views is shown harvesting bulb onions 13 from the ground 23, but this is only an example of one bulb the harvester is capable of harvesting. Harvester 10 is a towable harvester having a support frame 12 comprised of vertical, horizontal, angled and transverse members connected to one another and preferably made of rigid metal such as steel. Attached to what is considered the front end of both the support frame 12 and of harvester 10 is a rigidly attached tow hitch 14 also preferably of rigid metal. Tow hitch 14 may be made vertically adjustable, but should be affixable stationary relative to support frame 12 during harvesting, and additionally must include structuring to allow for the releasable connection at the distal end thereof to a tractor 16. Tow hitch 14 in FIG. 1 is shown connected to the rear end of a tractor 16, and a hydraulic lifting ram 18 is attached to both tractor 16 and tow hitch 14 so that hitch 14 and thus the front end of harvester 10 may be lifted and lowered (rocked up or down) by the ram 18 as desired, which allows for adjusting the height of foliage lifting and bulb handling equipment on harvester 10, and this also provides for ground clearance when moving the harvester 10 to and from the fields.

Support frame 12 of harvester 10 is shown in the drawings having two attached rotatable wheels 20 which rest and rotate on the ground and support the support frame 12 during harvesting. Metal rims having pneumatic tires work well as wheels 20. Two wheels 20 seem to be ideal with this towable embodiment, however more wheels could be used, and one wheel in the center of support frame 12 might also possibly be feasible considering the rigidity of the hitch 14.

Figure 2:
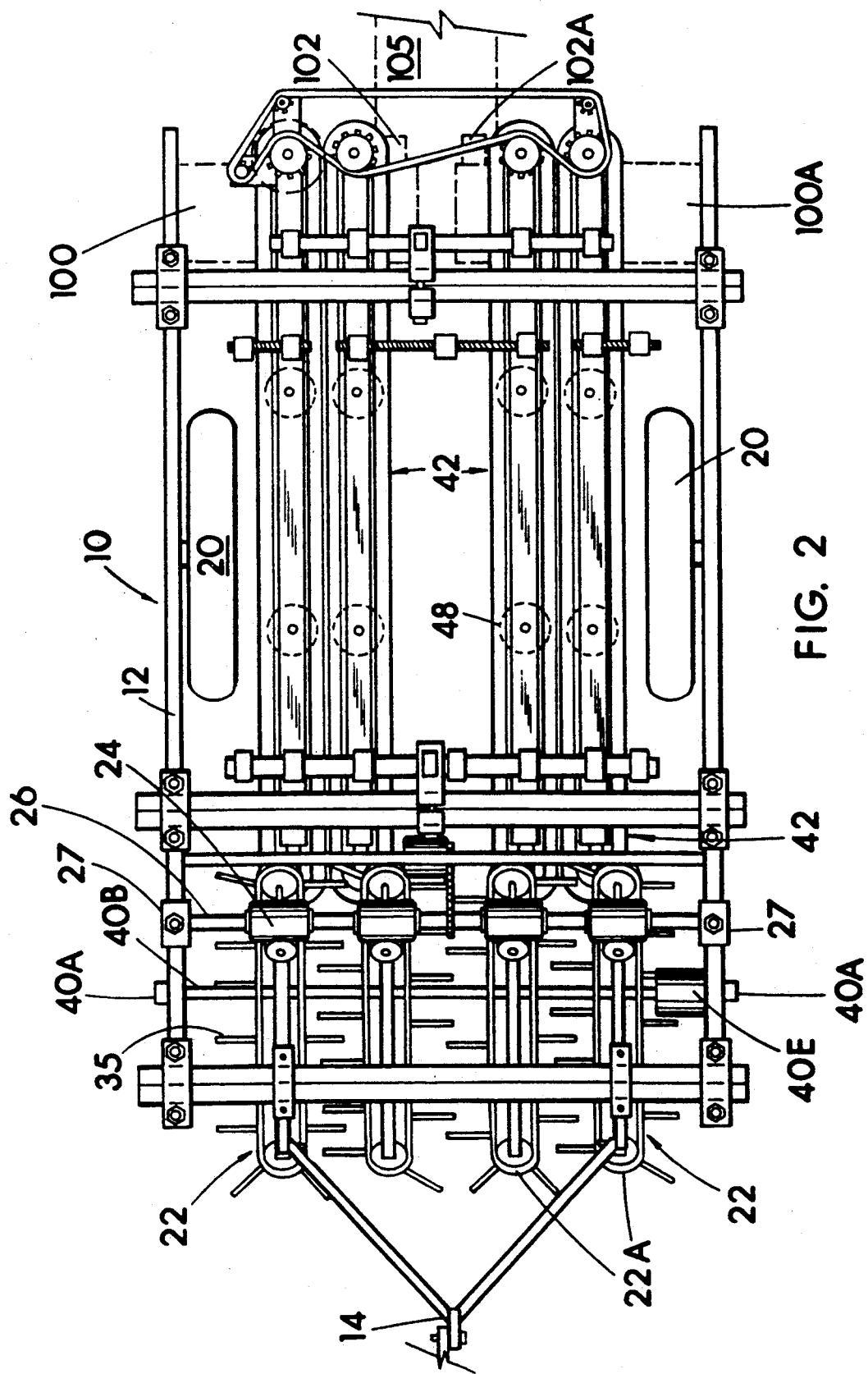
FIG. 2 is a top plan view of my first embodiment harvester which is shown structured to harvest two rows of onions or bulbs at a time. Additionally shown in this drawing using dotted lines is the general position of a transverse or cross conveyor system toward one end of the harvester which is part of the optional boxing or bagging arrangement.
Figure 4:
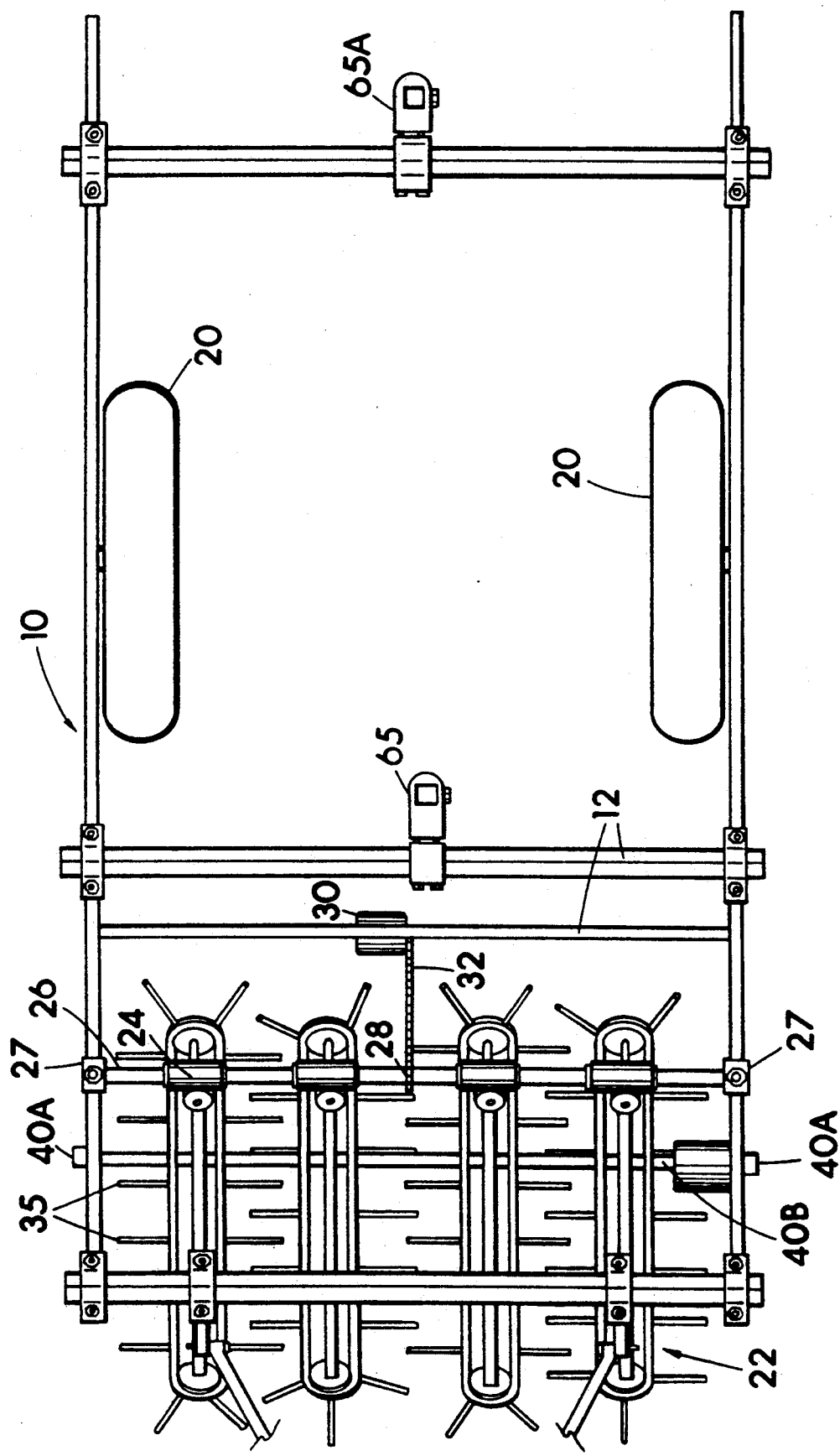
FIG. 4 is a top view of that which is shown in FIG. 3.
Figure 5:
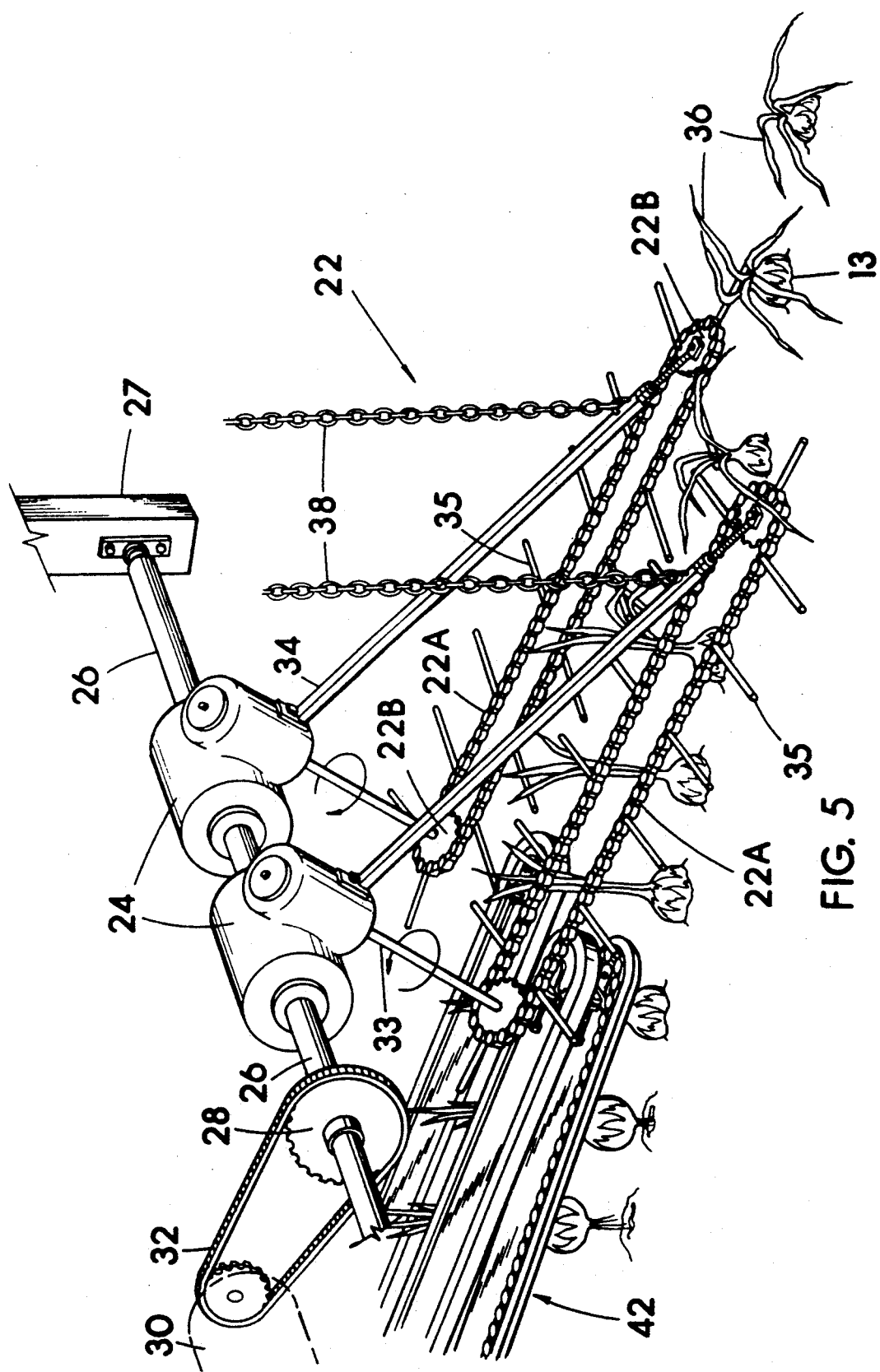
FIG. 5 is a perspective view of a matched set of foliage lifting members. Two foliage lifting members (rotary chains with extending fingers or members) are used in conjunction with one another for a single crop row, and four foliage lifting members are shown in the top views of FIGS. 2 and 4 to illustrate the harvester arranged to handle two crop rows at once. The two foliage lifting members are shown presenting vertically oriented foliage to the bulb lifting and positioning equipment which are pulling the bulbs upward from the ground.

Referring now mostly to drawing FIGS. 1, 2 and 5. Positioned at the front end of harvester 10 is the foliage lifting structure 22 (leaf lifting). The foliage lifting structure 22 is comprised of two elongated rotatable loops of flexible chain or belting per each crop row to be harvested as best shown in FIG. 5. Each elongated rotatable loop of a set in this example is drive chain 22A affixed around two rotatable and spaced apart sprockets 22B per chain 22A. From FIG. 5 one can see that two drive chains 22A are juxtaposed to one another to form a set for each crop row, and from FIG. 1, one can see that the drive chains 22A are affixed at a divergent angle relative to the ground 23 with the front end of each drive chain 22A, that which is that closest to tractor 16, is closer to the ground than the rear end of each drive chain 22A. As shown best in FIGS. 2 and 4, four drive chains 22A or two sets thereof are used for two crop rows at once. In order to cause rotation in each chain 22A a differential gear box 24 is used at each chain 22A. Each differential gear box 24 is attached to a generally horizontally disposed rotatable rod 26. Rod 26 is attached transversely to support frame 12 using bearings and hangers 27, one bearing and hanger 27 on each side of support frame 12 at each end of rod 26. Rod 26 is attached so as to allow for axially rotation of rod 26. A sprocket 28 shown best in FIG. 5 is affixed to rod 26 in the approximate center thereof, and a motor 30 is attached to a stationary member of support frame 12 and positioned so as to allow the coupling of the shaft of motor 30 to sprocket 28 with a drive chain 32. Motor 30 in this example is a hydraulic motor driven off the hydraulic system of tractor 16, but any suitable method or structure such as an electric motor or internal combustion engine might be used to ultimately cause rotation in rod 26. Speed or RPM control devices should ideally be applied to control motor 30 in order to have greater control over the speed of rotation of chains 22A. In harvester 10, all hydraulic motors thereon such as motor 30 are powered off of a hydraulic pumping system on tractor 16, and control levers 17 attached to the tractor 16 serve as fluid controls for motor RPM controls prior to a set of flexible hydraulic hoses 17A for each motor span from the tractor to the harvester 10. Referring again mostly to FIG. 5 where one can see that the generally horizontal rod 26 extends through each differential gear box 24, and a generally vertical shaft 33 extends from the bottom of each differential gear box 24 and connects to a sprocket 22B. A rigid bar 34 having two ends, is attached at one end thereof to a gear box 24, and the other end of bar 34 supports the second rotatable sprocket 22B of each loop of chain 22A. Rotation in motor 30 causes rotation in rod 26 which causes rotation in shaft 33 via gear box 24 which in turn causes the elongated loop of chain 22A to rotate. Attached to chains 22A are a plurality of extending rubbery fingers or members 35. Rubbery members 35 may be attached to chains 22A using adhesives and mechanical fasteners such as bolts, nuts and washers. Rubbery members 35 serve as outward reaching rake-like fingers or extensions to reach out and draw or rake in plant foliage which is leaning off-center of the bulb, and the "rubbery" aspect of the members 35 is desired because the members 35 often encounter the ground and or bulbs during harvesting. Rod 26 rotates in only one direction during harvesting, and this would present a problem if all differential gear boxes 24 were identical in gearing arrangement. It is necessary to have one chain 22A of a set to rotate in one direction, and the other chain 22A of that set to rotate in the opposite direction so that the members 35 within the center crack between two cooperatively functioning chains 22A are moving in the same rearward direction, and this is easily accomplished by procuring two different differential gear boxes 24 so that one shaft 33 rotates clockwise, and the other shaft 33 of the set rotates counterclockwise, and in this way the foliage 36 of an onion 13 may be raked into the center between a matched set of chains 22A with rotation of the chains 22A and with the raking effect provided by the extending rubbery members 35. Due to the divergent angle of the chains 22A to the ground, and due to the chains 22A rotating so as to pull the onion foliage into the center, the foliage of the onions is centrally gathered and lifted, and this lifting being primarily due to the divergent angle and the harvester moving forward toward the onions during harvesting at about the same rate that the rubbery members 35 are moving toward the rear of the harvester and thus being elevated. With the divergent angle of the chains 22A and the harvester moving forward toward the onions during harvesting at about the same rate that the rubbery members 35 in contact with the foliage are moving toward the rear of the harvester, the net effect is to generally lift the foliage straight above the bulb and ground for presentation to the front end of the bulb pulling and positioning equipment 42 which is positioned more toward the rear end of the harvester as one can see in FIG. 1, 2 and 5. Both chains 22A of a set rotate at the same speed during harvesting. Differential gear boxes 24 are of a type which are commercially available, and further of a type which could be rotated freely around rod 26, and consequently a vertically oriented flexible support chain 38 is attached to support frame 12 at one end and attached to the lower or front end of bar 34 to support the front sprocket 22B and the front end of each chain 22A from falling excessively into the ground during harvesting. This arrangement with chain 38 allows for each foliage lifting structure 22 as shown in FIG. 5 to bounce upward at the front end if a rock or large dirt clod is encountered, and then to fall back downward to its normal operating level as determined by the length of flexible chain 38. The chains 22A and the sprockets 22B could be substituted with V-belting and pulleys respectively, but this would not provide an arrangement which was quite as durable as using chains and sprockets. Differential gear boxes 24 are available from "TOL-O-MATIC, INC." of Minneapolis, Minn. U.S.A., and other gearing arrangements such as using bevel gearing could be used. Individual motors, one motor for each loop of chain 22A could also be used although it might be slightly more expensive.

Figure 6:
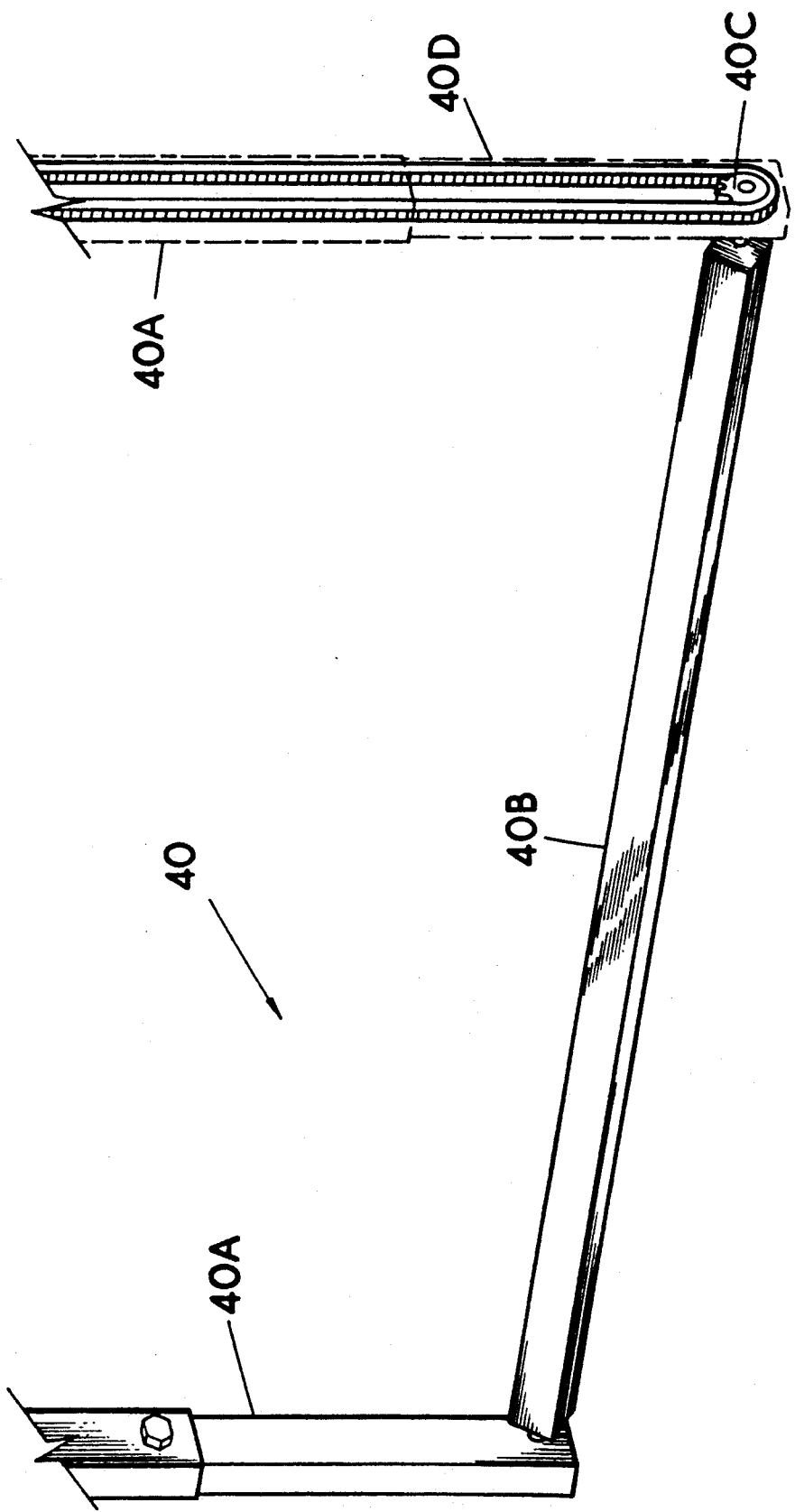
FIG. 6 is a perspective view of a rotatable bar which may be used for loosening soil under and around the bulbs, and which is positioned near the front of the harvester and partially in the dirt underneath the bulbs during harvesting.

Referring now mainly to FIG. 1, 2, 3 and 6 for a description of what I call a "rod weeder" 40 which is shown generally at the front of harvester 10, and in FIG. 1 it can be seen in a side view extending from its connection to an angled frame brace 21, downward below the foliage lifting structures 22 and into the ground and terminating slightly below the bottoms of the onions 13 during harvesting. Using a hydraulic ram 18 at the connection between tractor 16 and tow hitch 14, or another suitable method to tilt or rock the front of harvester 10 upward allows the pulling of the lowest portion of rod weeder 40 above the ground for moving the harvester to and from fields. Rod weeder 40 is comprised of two generally vertical rigid support members 40A, one of which is shown in FIG. 1 and the other of which is partly shown in FIG. 6 which connects to an oppositely disposed frame 12 angled brace member 21 (not shown) of that shown in FIG. Extending between and attaching to the two vertically oriented support members 40A at the bottom terminal ends thereof, is a rectangular rigid rod 40B positioned to extend across the harvester from one side to the other as may be ascertained from FIG. 2 Rod 40B is rotatably attached to support members 40A to allow axial rotation thereof. As shown in FIG. 6, a rotatable sprocket 40C is attached to a mounting rod supporting one end of rod 40B so that rotation in sprocket 40C equates to rotation in rod 40B. A loop of roller or drive chain 40D affixes around sprocket 40C and extends upward to a sprocket attached to the shaft of a motor 40E which is attached to support frame 12. As may be ascertained from FIG. 6, sprocket 40C and chain 40D are best positioned inside a hollow tubular support member 40A (shown in dotted lines) preferably having a closed bottom end, as this will prevent the chain and sprocket from being directly exposed to the ground during harvest Both of the support members 40A are best if made telescopic in order to allow for length adjustments thereof, and these length adjustments allow the raising and lowering of rod 40B, and it requires the chain 40D to have a link or two either added or removed when rod 40B is adjusted in height by changing the length of support members 40A. This independent length adjustment is sometimes necessary to position rod 40B in the proper position relative to the bottoms of the onions and mounded rows and to still have the other components such as foliage lifting structures 22 at the proper relative height to the top of the bulbs and the foliage. Motor 40E in this example is a hydraulic motor. Speed or RPM control devices should ideally be applied to control motor 40E. Motor 40E is capable of rotating chain 40D, sprocket 40C and thus rod 40B. During harvesting, rod 40B is positioned below the bottoms of the onions when the onions are sitting in their growing positions. The rod 40B is not supposed to strike the onions, but rather to spin and cause vibration in the dirt around and beneath the onions, so as to loosen the soil or ground, and thus the onions in preparation for the onions to be drawn from the ground more easily. The spinning rod 40B also cuts some of the longest of the roots in the ground below the onions, and this long-root cutting and soil loosening effect occurs generally at the same time the foliage is being positioned vertically oriented for presentation to the bulb pulling and positioning equipment 42 now to be described.

Figure 13:
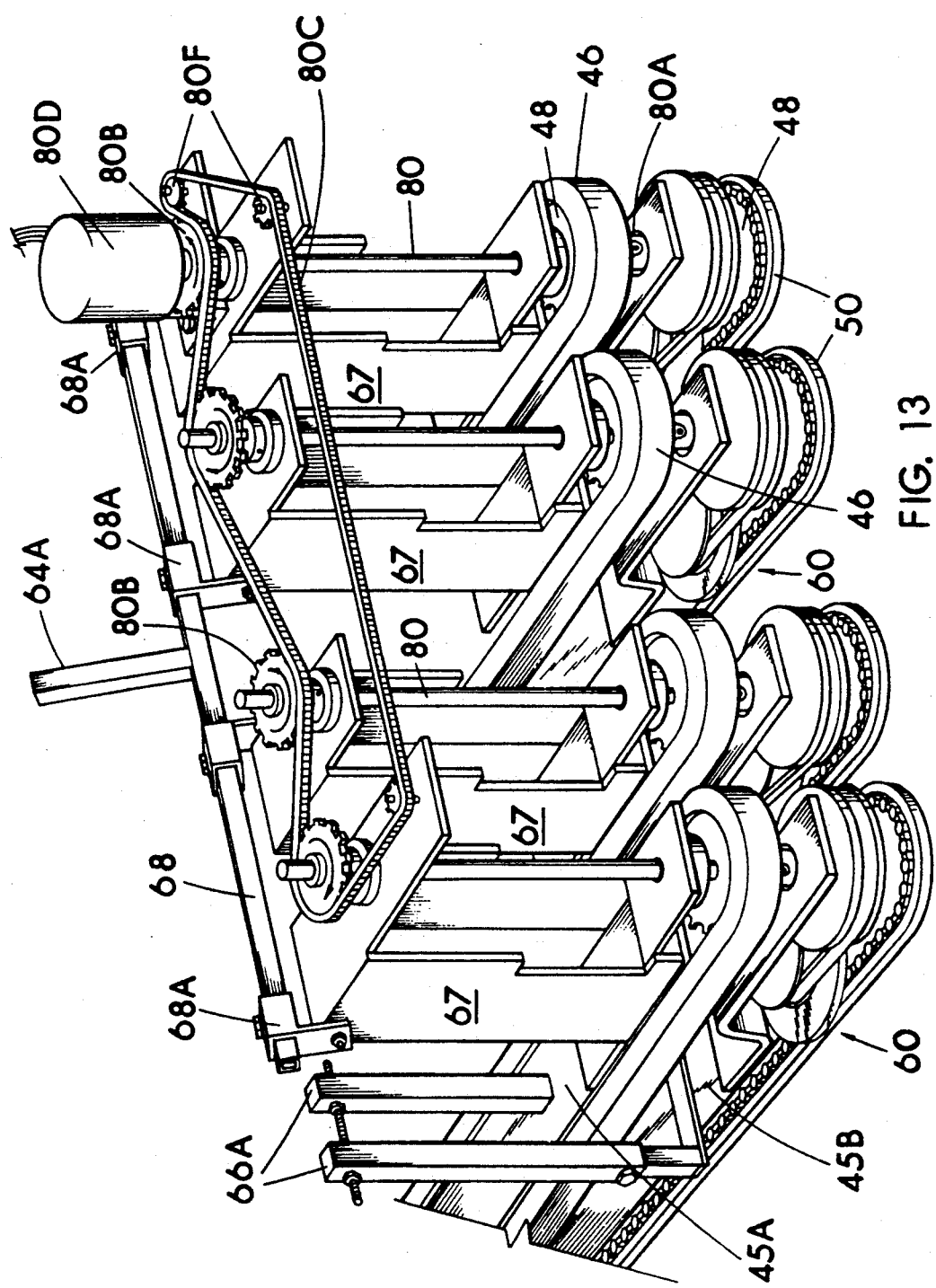
FIG. 13 is a view of additional components which attach to and or adjacent to the rear ends of the upper and lower belt support members (rectangular tubes). The shown structures being shafts, sprockets, drive chain, and a motor and support structures therefor, which work in conjunction with the bulb lifting and positioning equipment and the foliage cutting structure, and primarily serve as the components to cause rotation in the upper and lower sets of belts and the cutting blades during harvesting.

The bulb pulling and positioning equipment designated generally by 42 begins at what is considered adjacent the rear end of the foliage lifting structures 22, and then extends back toward the rear end of harvester 10 as may be ascertained from FIG. 1. The rear end of the bulb pulling and positioning equipment 42 is essentially that which is shown in FIG. 13. The front or forward most ends of the bulb pulling and positioning equipment 42 is positioned below, and extending somewhat underneath the rear ends of the foliage lifting structures 22 as may be ascertained from FIG. 1 and 5. The bulb lifting and positioning equipment 42 is essentially comprised of an upper set of two elongated and juxtaposed rotatable belts 46 defining a narrow crack of a width and position relative to the vertically oriented foliage presented by the foliage lifting structure 22 to receive, and for pinching or gripping the foliage of a bulb received from the foliage lifting structures 22. The two upper belts 46 are positioned divergent to the ground so as to receive the foliage 36 and to draw the bulbs upward from the ground by pulling on the foliage attached to the bulbs as the belts 46 rotate and transport the pinched foliage with attached bulbs rearward and up-hill toward the rear of the harvester. The upper belts 46 are also positioned divergent to a lower set of two belts 50. The lower set of two elongated belts 50 are spaced apart and juxtaposed to one another so as to define a second crack which is wider than the narrow crack defined by the upper belts 46. The crack between the two juxtaposed lower belts 50 is positioned directly below the upper narrow crack generally from the beginnings of the cracks adjacent the foliage lifting structures 22 to the rearward end of the harvester. The wider crack defined by lower belts 50 is also positioned to receive the foliage of a bulb from the foliage lifting structure 22. The foliage of a given bulb passes from the foliage lifting structure 22 into both the upper and lower cracks defined by the upper and lower sets of belts 46 and 50. The narrow upper crack tightly grips the foliage, and with rotation of both the upper belts 46 defining the crack toward the rear of the harvester, the bulb is drawn upward from the ground due to the divergent angle of the upper set of belts 46 to the ground wherein the front (toward hitch 14) of the upper set of belts 46 is closer to the ground and adjacent the foliage lifting structure 22, and further from the ground toward the rear of the harvester as may be ascertained from FIG. 1. Proper rotations of the upper set of belts requires one belt 46 of a set to rotate clockwise, and the other belt 46 of the set to rotate counterclockwise at the same rate, and these rotation directions are essentially the same for the lower sets of belts 50 as those skilled in the art will appreciate. The foliage with attached bulb of a given bulb being drawn upward by the upper set of belts 46 is positioned in the wider bottom crack between the lower belts 50 with the bulb positioned or hanging below the bottom plane or surface of the lower belts 50. The foliage may pass freely through the relatively wide crack defined by lower belts 50. The lower set of belts 50 are ideally (but not critically important) at a divergent angle to the ground so as to be positioned closer to the ground near foliage lifting structure 22, and further from the ground toward the rear end of the harvester 10, and this allows space for the placement of optional equipment such as root cutters and a lifting conveyor toward the rear of the harvester. The upper set of belts 46 is positioned at a divergent angle to the lower set of belts 50, so as to place the front ends of the upper and lower sets of belts 46 and 50 closer to one another adjacent the foliage lifting structure 22, and further apart from one another toward the rear end of the harvester 10, or in other words, the upper set of belts 46 extends toward the rear of the harvester at a fairly steep upward angle, and the lower set of belts 50 extends toward the rear end of the harvester at a less step upward angle (or conceivably no angle at all to the ground) compared to the upper set of belts 46.

As a bulb is drawn upward from the ground by the upper set of belts 46 pulling on the foliage attached to the top of the bulb, the bulb is also drawn upward toward the lower set of belts 50, and the bottom surface or bottom plane of the lower set of belts 50. The crack defined by the lower set of belts 50 is just wide enough relative to the bulb to allow the bulb to be partially drawn upward into the crack between belts 50 whereat further upward drawing of the bulb relative to the lower set of belts 50 is restricted by the abutment of the top outer side edges of the bulb against the bottom plane or surface of the lower set of belts 50 as may be ascertained from FIG. 14. With continued rotation of the upper set of belts 46 pinching the foliage, the bulb which is abutted and maintained against the lower set of belts 50, is pulled or moved along toward the rear of the harvester at a known, preset, and predictable height relative to a cutting arrangement 60 (rotating cutting blades) mounted at the rear end of the harvester. The upper set of belts 46 allows the foliage pinched therebetween to slip between the belts 46 or be drawn downward a little through the narrow pinch crack only after the bulb has abutted the lower set of belts 50, since the spacing continues to widen between the upper and lower sets of belts even after the bulb has abutted the bottom surface or plane of the lower belts 50, and the bulb cannot move any higher relative to the lower set of belts 50. The lower set of belts 50 during harvesting are rotated at the same rate and direction as the upper set of belts 46 so that the belts 50 abutted against the top of the bulb move and assist in moving the bulb(s) toward the rear of the harvester where the foliage and bulbs are passed through the cutting arrangement 60 which cuts the foliage from the bulbs at the predetermined position as set by the crack between the lower set of belts 50 and the relative position of the cutting arrangement 60 to the crack between the lower set of belts 50. It should be noted that rotating belts 50 could be replaced with very smooth plastics or metal non-rotating members "skids" which define the wider crack and provide the bottom plane or surface for the bulbs to abut when drawn upward by the upper belts 46. This arrangement with "skids" defining the crack rather than rotating belts 50 will in most cases function well and is less costly to build and maintain. However the one drawback with skids as opposed to rotating belts 50 is that the bulbs on occasion have a tendency to rock or tip (trailing behind the foliage) as they are slid along the abutment surface (depending on the degree of frictional adhesion), and this tilting can lead to angular cuts of the foliage from the bulb. This angular cutting would be rare with "skids", but can generally be totally eliminated by using rotating belts 50 which help move the bulb at the same rate that upper belts 46 are moving the foliage and bulb, and therefor bulb tilting is very rare with rotating lower belts 50.

Widening the crack between the lower set of belts 50, or "skids" if used, allows for cutting closer to the top of the bulb, assuming a given size bulb, since the rounded top of the bulb would be positioned higher in the crack before abutment with the belts 50 occurred. Bulbs in a given field generally all fall into a fairly close size range to one another since they are planted at the same time and are of the same variety, but bulbs in different fields or of a different variety are often of different size ranges, and therefor it is desirable to have width adjustment capabilities in the lower crack between belts 50. Bulbs in different fields and or of different varieties also have different thickness and length ranges of foliage attached to the bulbs, and different growing positions of the tops of the bulbs relative to the top of the ground. Therefor, it is also desirable to have adjustment capabilities for altering the angle of divergence of the upper set of belts 46 relative to the ground and to the lower set of belts 50, and for altering the angle of divergence of the lower set of belts 50 relative to the ground, and for raising or lowering both sets of belts 46 and 50 relative to the ground and to the foliage lifting structures 22. It is also desirable to be able to adjust both the upper crack between belts 46 and the lower crack between belts 50 in width, and independently of one another. The more adjustment capabilities provided in a single harvester of this nature, the greater the number of size ranges of bulbs, and the greater number of varieties of bulbs a single harvester will be able to properly harvest, and without damaging the bulbs. Furthermore, failure rate of properly handling the bulbs in a non-damaging manner, and of properly cutting the foliage from the bulbs is of course a concern, and certain aspects of the harvester 10 as broadly described above will now be more narrowly described so as to detail certain structural features which will improve the overall performance of such a harvester.

Figure 7:
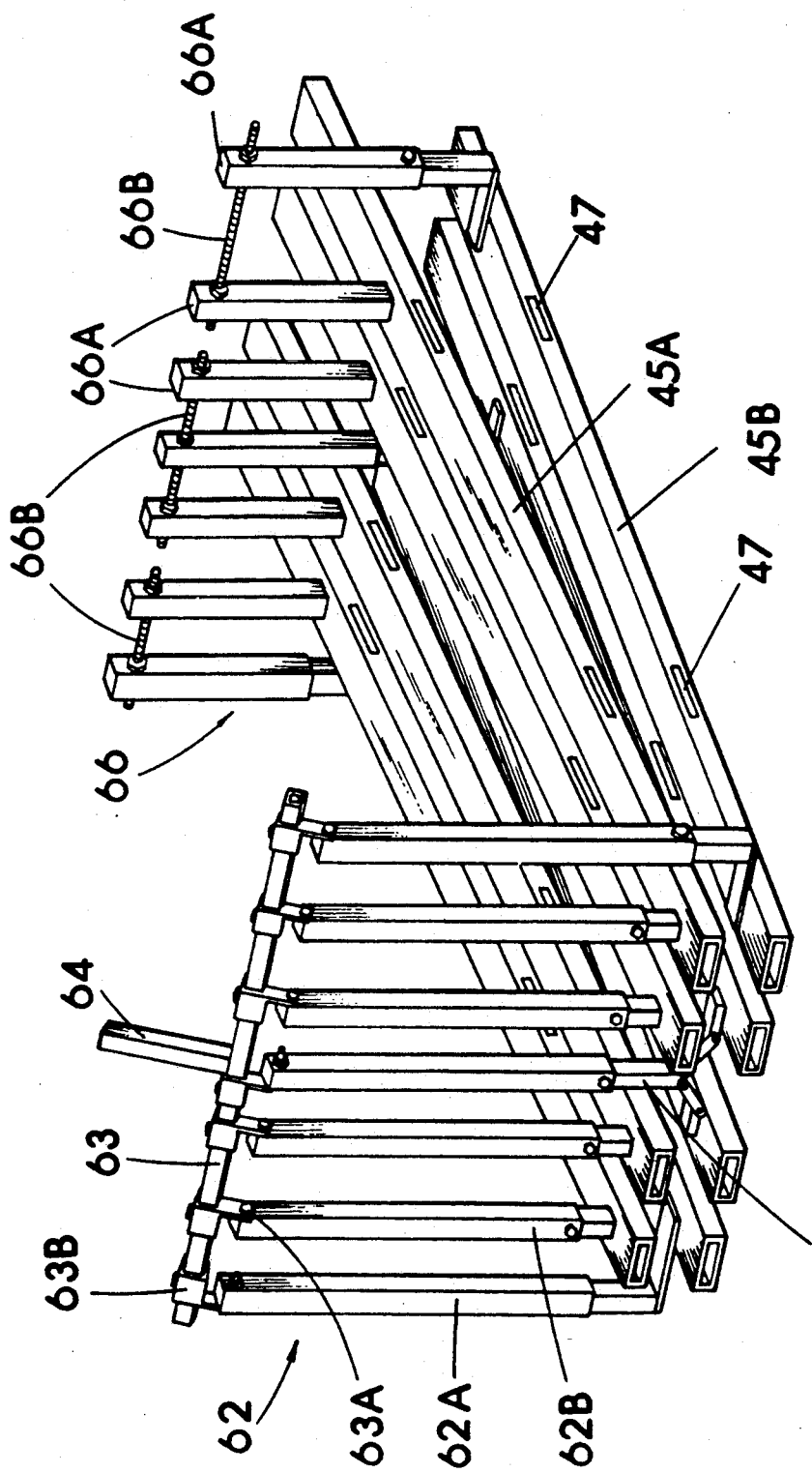
FIG. 7 is a perspective view of some of the bulb lifting and positioning equipment which is removed from drawing FIGS. 3 and 4. Shown are a plurality of vertically oriented adjustable hangers and ties attached to a plurality of somewhat more horizontally disposed elongated upper and lower belt support members (rectangular tubes) which are part of the bulb lifting and positioning structure of the harvester. Many components have been removed for the sake of clarity of that which is shown.
Figure 14:
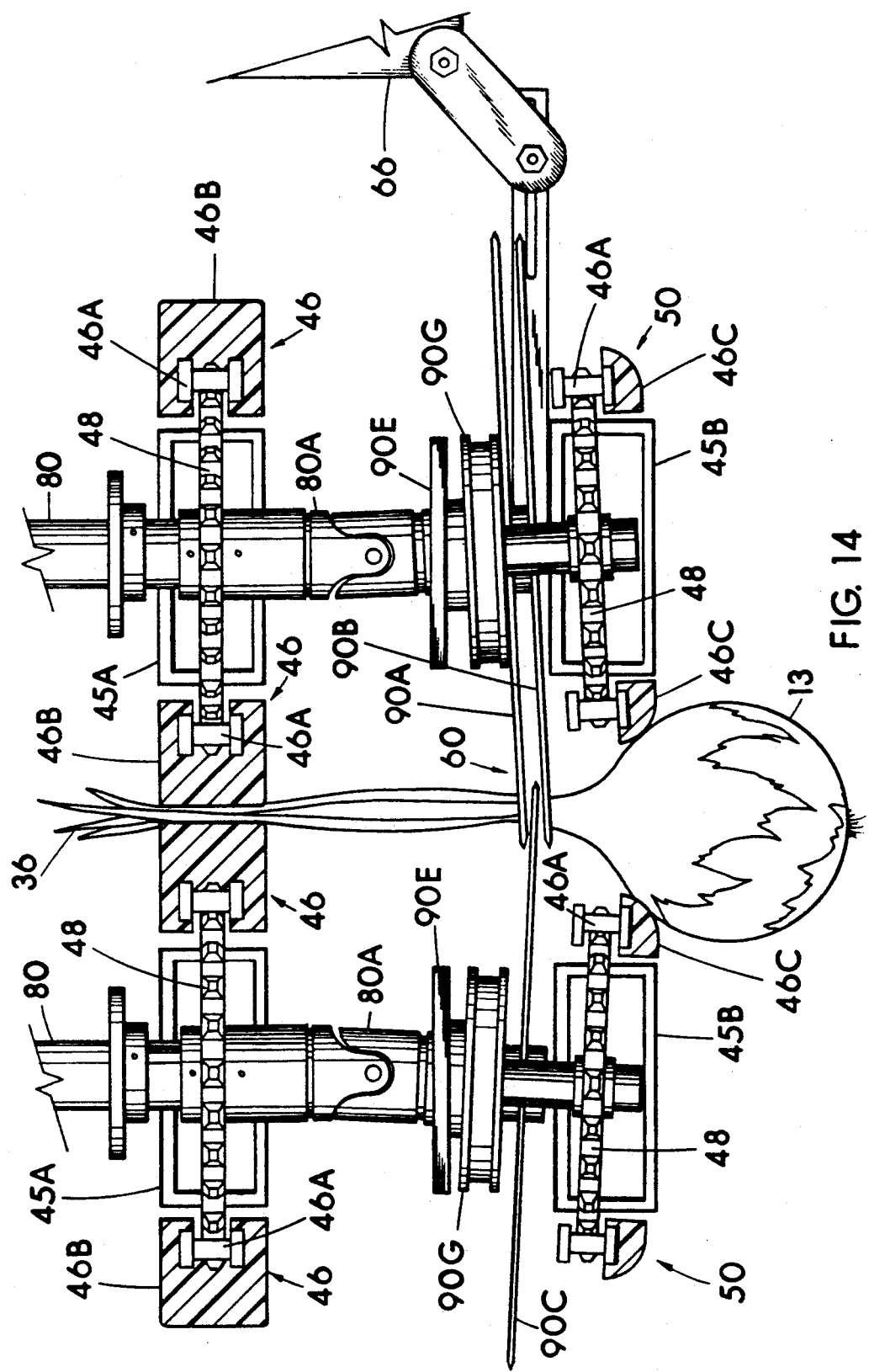
FIG. 14 is a partial cross-sectional view at the rear end of the harvester showing foliage and bulb handling and positioning at the approximate moment of cutting the foliage from the bulb by cutting blades.

The bulb pulling and positioning equipment 42 for a single crop row may be further or more narrowly comprised of four elongated hollow rectangular tubes, two top tubes 45A and bottom tubes 45B shown best in FIG. 7. The two juxtaposed top tubes 45A work together as a set, and the juxtaposed two bottom tubes 45B work together as a set, and all four tubes with the top tubes 45A positioned generally straight above the bottom tubes 45B work in conjunction with one another to rotatably support the upper set and the lower set of belts 46 and 50, and to thereby assist in defining the upper and lower cracks. The description of these "tubes" is for examples only, as these members need only be rigid, elongated and straight members of some type, or any suitable structural arrangement to mount rotatable sprockets 48 (channel or angle iron), and rectangular tubing meets these criteria, and is strong, lightweight and readily available. In FIG. 7, eight rectangular tubes are shown, as this is an arrangement for harvesting two crop rows at once, and in this view sprockets 48 are not as of yet affixed, but two slots 47 through each tube 45A and 45B have been cut in preparation for mounting the middle rotatable sprockets 48 in the slots with vertically oriented axles. The middle rotatable sprockets 48 when mounted in slots 47 are wide enough to stick-out on each side of the rectangular tubing. Each of the tubes 45A and 45B supports a belt 46 or 50. The belts 46 and 50 may each be made of a loop of flexible chain 46A, and the chain in this example is drive or roller chain 46A which is covered in part with flexible plastic or rubbery belting material, and thus the term belt 46 or belt 50. The chains 46A are supported by a plurality of sprockets 48 rotatably affixed to each of the tubes 45A and 45B. One rotatable sprocket 48 is attached to or adjacent each of the two oppositely disposed ends of each tube, and two sprockets 48 are attached in the length of each tube 45A and 45B in slots 47. One endward positioned sprocket 48 (front end of the tube positioned toward front end of harvester) is adjustably attached to the front end of each of the tubes 45A, 45B with the adjustment feature providing tightening or loosing capabilities for belts 46 and 50 by way of inward or outward movement of the front sprocket 48. The rearward end sprocket 48 is affixed to a vertically oriented drive shaft 80 adjacent the rear end of the tubes 45A and 45B as shown in FIG. 11 and 12, and all sprockets 48 on a given tubes are positioned in a straight line with one another. A loop of chain 46A is rotatably supported by the four sprockets 48 on each of the tubes 45A and 45B. The chains 46A of the top tubes 45A are covered with flexible or rubbery belting material 46B, but the backside where the sprockets 48 engage the chain 46A are left open to allow meshing of the chain 46A and sprockets 48. The belting material 46B is attached to the chains 46A so as to provide soft surfaces which will not cut the foliage of a bulb (see FIG. 14). Belting material 46B may be made of flexible polyurethane material or the like which is affixed with adhesives or bonding agents to chain 46A. The chains 46A of the bottom tubes 45B need not be covered with belting material to the extent of chain 46A of upper tubes 45A, but do include an affixed soft belt 46C of polyurethane or the like as shown in FIG. 14. The belt material 46C as shown in FIG. 14 covers the bottom and the outer side of the chain 46A of the lower tubes 45B so that bulbs do not come in direct contact with the chain 46A which would cause damage (dents) to the bulbs. Other soft and rubbery material other than polyurethane can be used for the belting material to appropriately cover chains 46A in the areas thereof which contact bulbs or foliage. Pulleys and belting could be used to eliminate chains 46A and sprockets 48, but chains 46A on sprockets are much less likely to slip out of time during rotation than are V-belts on pulleys, and some aspects of this harvester rely on good relative timing between certain components. For example, if one of the two upper belts 46 (plastic covered chain) defining the narrow upper crack were to begin slipping on a pulley, then there would be a higher incident of foliage being cut in the pinch crack between the two upper belts 46 since one belt 46 would be moving at a different rate relative to the other belt 46 which would tend to shear the pinched foliage, leading to the dropping of the bulb back to the ground. If one had to choose between metal chains 46A only, and rubbery belts only, one should choose the rubbery belts because of their non-damaging effects on bulbs and foliage, however belt cover chains as just explained provide the non-slip (timing) and padding qualities which are most desirable.

Figure 3:
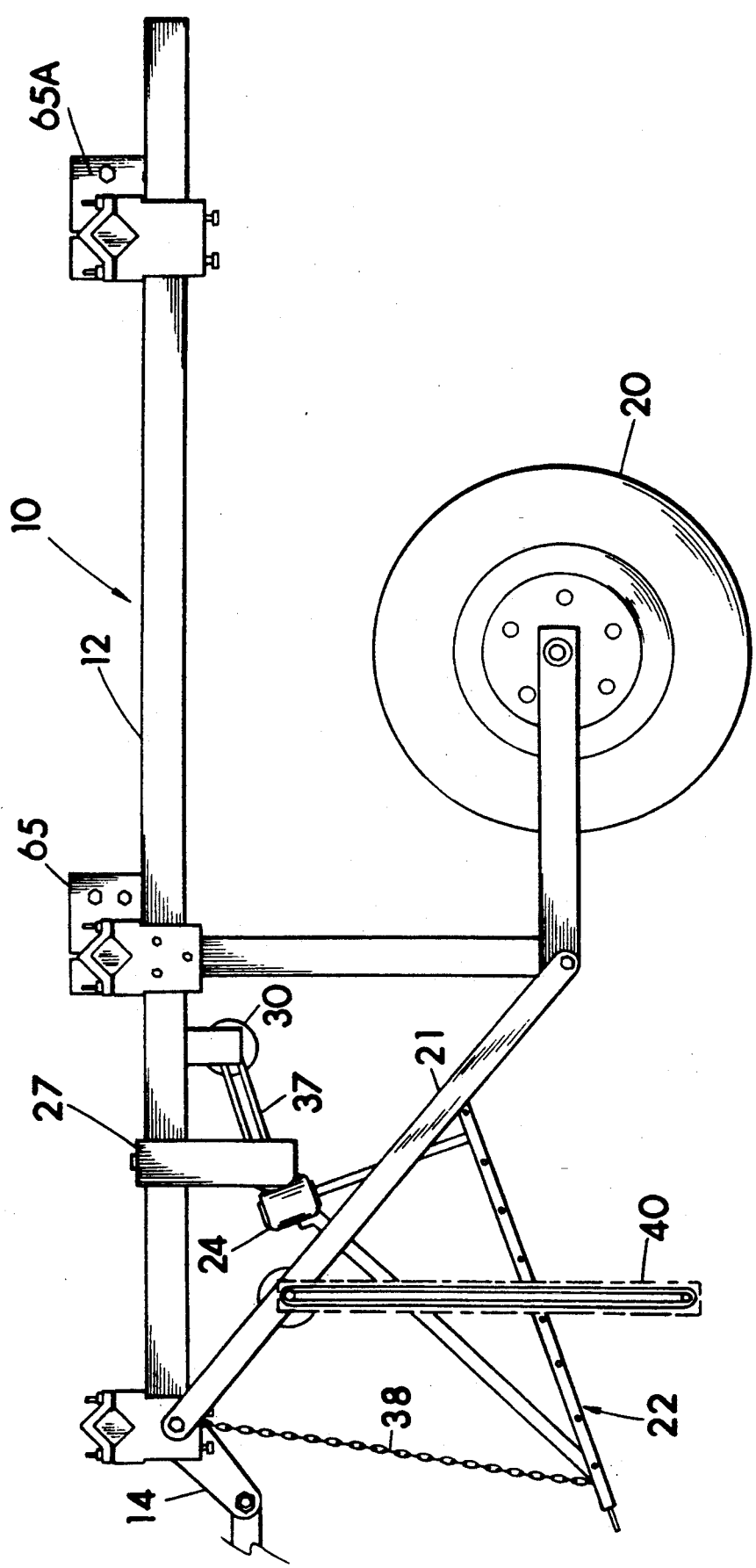
FIG. 3 is a side view of my first embodiment harvester showing the towable support frame from which bulb lifting and positioning, and foliage cutting components normally positioned in the area adjacent the wheels and rear end of the harvester as shown in FIG. 1 and 2 have been removed for the sake of clarity of illustrating the support frame. Foliage lifting members are shown attached to the frame at what is considered the front end of the frame and of the harvester.

In FIG. 7 one can see that a plurality of vertically oriented hangers generally designated by 62 are used to support the front end of the tubes 45A and 45B with generally one hanger attached by welding or other suitable attachment methods to each of the tubes 45A and 45B. The upper ends of the hangers are shown attached to a horizontally disposed bar 63, and that bar 63 has an upward extending pin 64 affixed thereto in the approximate center. The pin 64 is one of two pins, and in FIGS. 1 and 13, the second pin 64A is shown. The pins 64 and 64A are rigid and strong in nature (steel bar), and are sized and shape to be inserted into receiver sockets 65 and 65A attached to support frame 12 and shown in FIG. 3 and 4. Receiver sockets 65 and 65A allow the passage of pins 64 and 64A therethrough as the receivers 65, 65A are open in the center from top to bottom with a tubular passage. Mounted on the side of receiver sockets 65, 65A are setscrews which allow for the releasable affixment of pins 64, 64A within receiver sockets 65, 65A. Pins 64, 64A, and therefore the equipment below and supported to pins 64, 64A may be lowered or raised relative to both support frame 12 and the ground by positioning pins 64, 64A further up or down relative to receiver sockets 65, 65A prior to tightening the set-screws. The bulb pulling and positioning equipment 42 and the cutting arrangement 60 attached thereto in simple terms might be considered a unit which "plugs" into the support frame 12. In FIG. 3 and 4, the bulb pulling and positioning equipment 42 and the cutting arrangement 60 are un-plugged and not shown, and in FIGS. 1 and 2, the bulb pulling and positioning equipment 42 and the cutting arrangement 60 are plugged into support frame 12 at receiver sockets 65, 65A. This height adjustable plug-in arrangement has advantages such as from a manufacturing and servicing standpoint beyond that of simply rending easy height adjustability.

Figure 10:
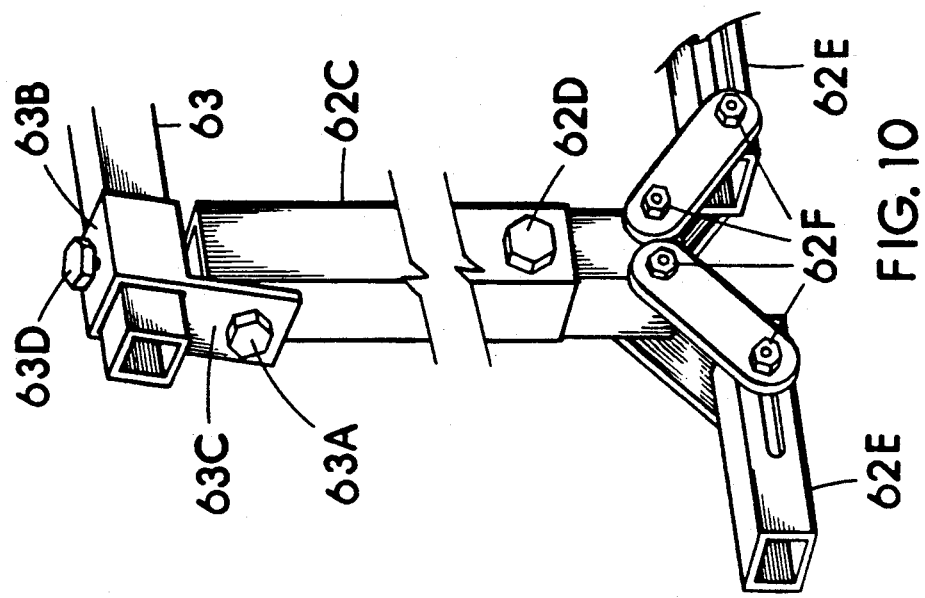
FIGS. 8, 9, and 10 show typical adjustable hangers (shown in FIG. 7) which may be utilized to support what is considered the front ends of the belt support members (rectangular tubes) shown in FIG. 7.
Figure 9:
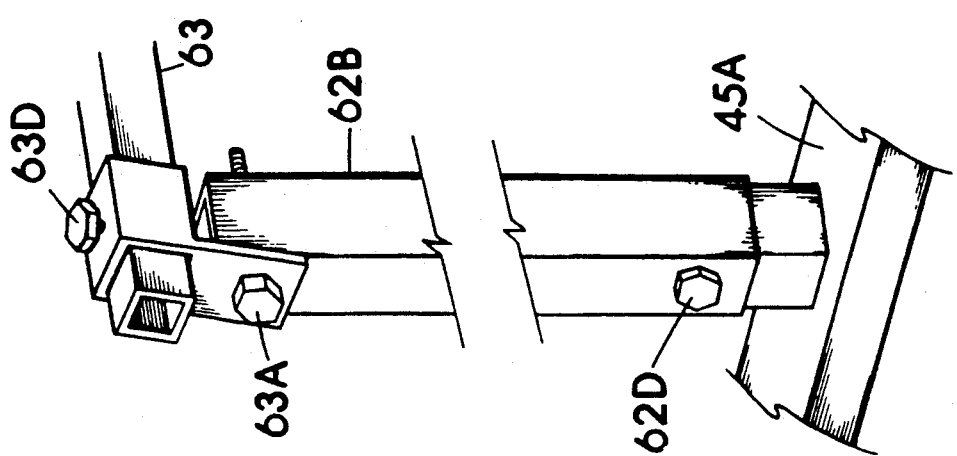
Figure 8:
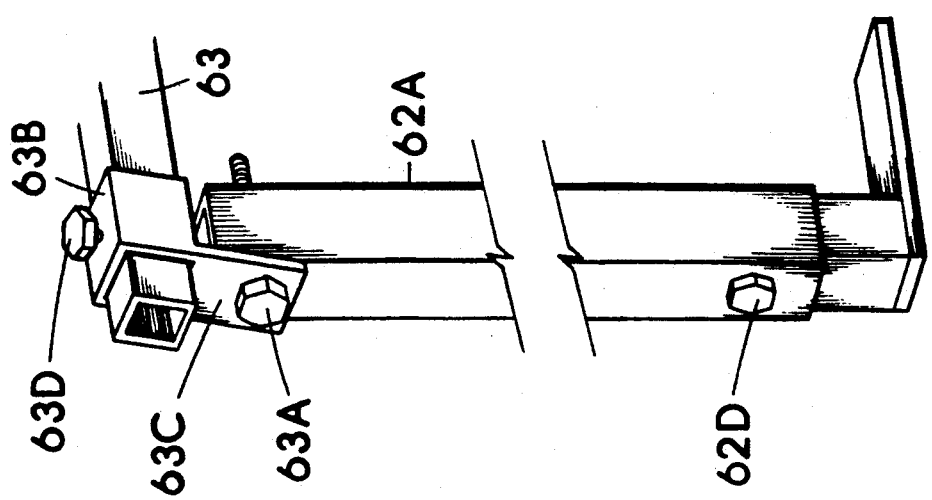

The hangers 62 which may be used at the front ends of the tubes 45A and 45B are shown enlarged in FIGS. 8, 9, and 10 where they are separately designated 62A, 62B, and 62C. There are essentially three basic hanger styles which work well. The hanger 62A shown in FIG. 8 is used for catching the lower tubes 45B, and since the lower tubes 45B are generally directly underneath the upper tubes 45A, this is the reasoning for the lower off-set plate extending at a 90 degree angle, which may be bolted or welded to the top of the tubes 45B. The hanger 62B shown in FIG. 9 is a hanger suitable for attaching to the top center of a upper tube 45A such as by welding. The hanger 62C shown in FIG. 10 is a suitable hanger for attaching to and supporting two middle lower hanger 45B as may be ascertained from FIG. 7. The hanger 62C may also be used at the rear end of the tubes 45B to support two middle tubes 45B of a multiple row harvester, only the upper end of the hanger 62C should be modified if used at the rear of the harvester as will be explained. All three of the hangers 62A, 62B and 62C of FIGS. 8, 9, and 10 are comprised of at least two members in the vertical which are telescoped together and affixable stationary together with set-screws 62D so as to render the vertical portions of the hangers adjustable in length. Additionally, each of the hangers 62A, 62B and 62C is affixed by a connection to horizontal bar 63 which allows pivoting or angular changes by loosening a bolt 63A, adjusting the angle of the vertical position of the hanger, followed by tightening the bolt 63A again to render the angle fixed relative to horizontal bar 63. Each of the three styles of the hangers 62A, 62B and 62C in FIGS. 8, 9, and 10 are attached by the pivotal connection at bolt 63A to a collar 63B fitted on horizontal bar 63. The collars 63B each include an affixed downward extending plate 63C for attachment of the collars to the vertical portions of the hangers with bolt 63A. The collars 63B are slidable on bar 63, and may be affixed stationary on bar 63 by tightening set-screws 63D. The hanger 62C of FIG. 10 additionally includes two members or bars 62E extending relatively horizontally outward so as to span and attach one bar 62E to the top of a tube 45B as may be ascertained from FIG. 7. These bars 62E are adjustable inward and outward by way of tightening and loosening bolts 62F, which allow the spreading or the drawing together, or angular change of the two adjacent tubes 45B supported by the single hanger 62C. Between the adjustment capabilities of up and down (telescopic vertical members affixable stationary by set-screws 62D), and left and right (slidable collars 63B), and pivotal or angular change provided by the plate 63C of collars 63B and bolt 63A, and further with the up and down adjustment provided by pins 64, 64A and receiver sockets 65, 65A, the positions of tubes 45A and 45B, and thus belts 46 and 50 may be adjusted to fit a wide variety of bulb size ranges, foliage length and thickness, and soil conditions, that is, level or un-level, or mounded or un-mounded ground. Of course the rear end of the tubes 45A and 45B must be such that such adjustments to the front ends are allowed.

Referring now mainly to FIGS. 7 and 13 for a more detailed description of the supporting arrangement of the rear ends of tubes 45A and 45B and thus belts 46 and 50. As shown in FIG. 7 and generally designated by 66 is a plurality of generally vertically oriented members or "ties" 66A at what is considered toward the rear or rearward ends of tube 45A and 45B. The ties 66 are more appropriately call "ties" as opposed to hangers since they tie the tubes 45A and 45B together as a unit rather than hang them from a horizontal member such as bar 63 at the front end. The vertical portions 66A of the ties 66 which connect by welding or other suitable methods to the central tops of the upper tubes 45A are non-telescopic tubes. The vertical portions 66A of the ties 66 which connect to the lower tubes 45B are telescopic for length adjustment similar to the hangers 62 at the front end of the tubes 45A and 45B. The central rearward tie 66, that which is straight back or rearward from hanger 62C at the front in FIG. 7 also includes two members or bars substantially the same as bars 62E extending relatively horizontally outward so as to span and attach one bar to the top of a tube 45B which is partially shown in FIG. 14. As may be ascertained from FIG. 13, the rearward terminal ends of upper tubes 45A are attached by welding or other suitable methods to the bottom ends of box-like support structures 67, one support structure 67 to each upper tube 45A. Each of the box-like structures 67 is formed of a plurality of affixed together vertical and horizontal metal plates. Positioned above the box-like structures 67 is a generally horizontally disposed bar 68 having a collar 68A affixed thereon for each of the box-like structures 67. The collars 68A in this example are the same as collars 63B, being slidably affixed on bar 68, being affixable stationary on bar 68 with set-screws, and having downward extending plates. The extending plates of collars 68A as shown in FIG. 13 are affixed with a nut and bolt to the top of box-like structures 67 in a manner which allows pivoting for angular changes if desired, and securement of a given angle by tightening of nut and bolt. The horizontally disposed bar 68 has pin 64A affixed thereto, and as previously discussed, pin 64A when secured in receiver socket 65A ultimately supports the rearward end of the tubes 45A and 45B. However, since the box-like structures 67 are connected at the bottom ends thereof only to the upper tubes 45A, and at the top ends thereof to bar 68 via collars 68A, one can understand the need for ties 66 which essentially help support and stabilize the rearward end of lower tubes 45B by tieing them to the stabilized and supported upper tubes 45A. This tieing together of tubes 45A with 45B needs to be in an adjustable manner if the wide array of adjustments to the positions of the belts 46 and 50, and the upper and lower cracks defined thereby is to be provided. As previously stated, the vertical portions 66A of the ties 66 which connect to the lower tubes 45B are telescopic for length adjustment similar to the hangers 62 at the front end of the tubes 45A and 45B. As may be seen in FIG. 7 and 13, all-thread rod 66B is used to connect the vertical portions 66A of the ties 66 together. The all-thread rods are passed through holes in the vertical portions 66A of the ties 66, and nuts and washers are applied to the all-thread. The all-thread rods 66B are cut long so as to have threaded rod sticking out on each side of the vertical portions 66A of the ties 66 which allows for adjusting the spacing between the verticals 66A by the manipulation of the nuts on the all-thread. The holes in the vertical portions 66A of the ties 66 are sized to allow free sliding of the all-thread 66B when the nuts are loosened, and therefor do provide for angular changes such as for positioning upper tubes 45A and belts 46 at a steeper angle relative to lower tubes 45B and belts 50 when desired.

Referring now mainly to FIGS. 11, 12, 13 and 14 for a brief description of components for causing rotation in upper and lower belts 46 and 50, and for a description of the preferred foliage cutting arrangement 60. In FIG. 13 drive shafts 80 are shown generally vertically oriented and supported by horizontally disposed plates of box-like support structures 67, one drive shaft 80 per each box-like support structure 67, which equates to one drive shaft 80 for driving an upper belt 46 and a lower belt 50 which is positioned directly below that belt 46. A universal joint 80A is attached at the lower end of drive shaft 80 between upper belt 46 and lower belt 50 shown best in FIG. 14. Universal joint 80A allows for a degree of angular difference between a "set" of two lower belts 50 which will often exist depending on the width of the crack defined between the two belts 50, again as best illustrated in FIG. 14. Two sprockets 48 are attached to each drive shaft 80, one sprocket 48 for lower belt 50, and one sprocket 48 for upper belt 46. At the upper end of each drive shaft 80 is a sprocket 80B which is coupled to a drive chain 80C. One drive shaft 80 is connected to the rotary shaft to a hydraulic motor 80D, the housing of motor 80D is affixed by a length adjustable bracket 80E (see FIG. 1) to a box-like support structure 67. Drive chain 80C is additionally coupled to three idler sprockets 80F so that chain 80C may connect on one side of a sprocket 80B and on the other side of the next sprocket 80B, and in this manner the adjacent drive shafts 80 which drive a set of belts 46 or 50 will be running one clockwise and one counterclockwise as previously discussed. Drive shafts 80 should include a key way and key to prevent rotation of sprockets and support collars attached thereto. Drive shafts 80 should be made long enough to allow for repositioning the shafts 80 upward or downward relative to box-like support structures 67, and this will allow the spreading or the bringing closer together of the belt 50 relative to a belt 46 on a given shaft 80. Those skilled in the art will realize support collars and sprockets on the drive shaft 80 will need to be repositioned vertically on the drive shaft 80 when the spreading or the bringing closer together of a belt 50 relative to a belt 46 on a given shaft 80 is desired.

Referring now mainly to FIGS. 1, 12, 13 and 14 for a detailing of cutting arrangement 60 which is a general designation of what could be any suitable structure for cutting the foliage attached to a bulb from the bulb. Although a variety of arrangements might function adequately, the one to be detailed will provide a very low failure rate and is therefore preferred. Cutting arrangement 60 is positioned at the rear end of the harvester beyond (rearward) of the location where the bulbs have been lifted from the ground and have abutted against the bottom plane provided by the lower set of belts 50. The preferred cutting arrangement 60 is comprised of three generally identical circular cutting blades 90A, 90B and 90C which are similar to the types used in electric powered circular hand-saws for cutting plywood. Two of the blades 90A and 90B are supported and stacked one above the other on a rotatable shaft 90D, and the blades 90A, 90B are attached so as to rotate with shaft 90D. The shaft 90D shown in dotted lines in FIG. 12 is vertically positioned and rotatably supported at the lower end by an attachment to a lower tube 45B and at the upper end by a rotational attachment to a support plate 90E which is also affixed to the same lower tube 45B as may be seen in FIG. 12. All lower tubes 45B have a shaft 90D and at least one cutting blade. Additionally attached to each shaft 90D is a pulley 90F. A pulley 90G is attached to each adjacent drive shaft 80, and a belt 90H couples the pulley 90G to the adjacent pulley 90F on the same tubes 45B so that rotation in drive shaft 80 equates to rotation in the blade or blades 90A, 90B or 90C affixed to shaft 90D. The shafts 90D which are spaced apart from one another but adjacent one another (side by side), one on each adjacent a lower tubes 45B supporting a set of lower belts 50 which are defining a crack and the abutment surface for upwardly drawn bulbs work in conjunction with one another wherein one shaft 90D has two cutting blades 90A and 90B, and the adjacent shaft 90D has one blade 90C. In FIG. 14 it can be seen that the two blades 90A and 90B are stacked one above the other and that a narrow space or gap is left between the two blades 90A, 90B, and that these rotary blades extend outward and a little beyond the center of the path of the foliage between the upper and lower crack defined by the upper and the lower sets of belts 46 and 50. It can be further seen that the single blade 90C also extends outward and a little beyond the center of the path of the foliage between the upper and lower cracks defined by the upper and the lower sets of belts 46 and 50, and further that the outer edge of blade 90C is fitted into the space or gap between the two blades 90A and 90B. During operation of the harvester, the two stacked blades 90A and 90B will both be rotating in one direction, counterclockwise for example, and the single blade 90C will be rotating in the opposite direction, clockwise. The blades 90A, 90B and 90C will all be rotating in a direction which will both tend to pull the foliage during cutting inward toward the cutting blades and toward the rear of the harvester. The blades 90A, 90B and 90C are all mounted above the wider crack define by a set of lower belts 50, and from FIG. 14 where a bulb is abutted against the bottom plane defined by the lower set of belts 50, it can be seen that the blades 90A, 90B and 90C are positioned to cut the foliage just slightly above the bulb, and this location of cutting relative to the bulb could to moved closer or further from the bulb by widening or narrowing the crack defined by the lower set of belt 50 as previously explained.

Figure 15:
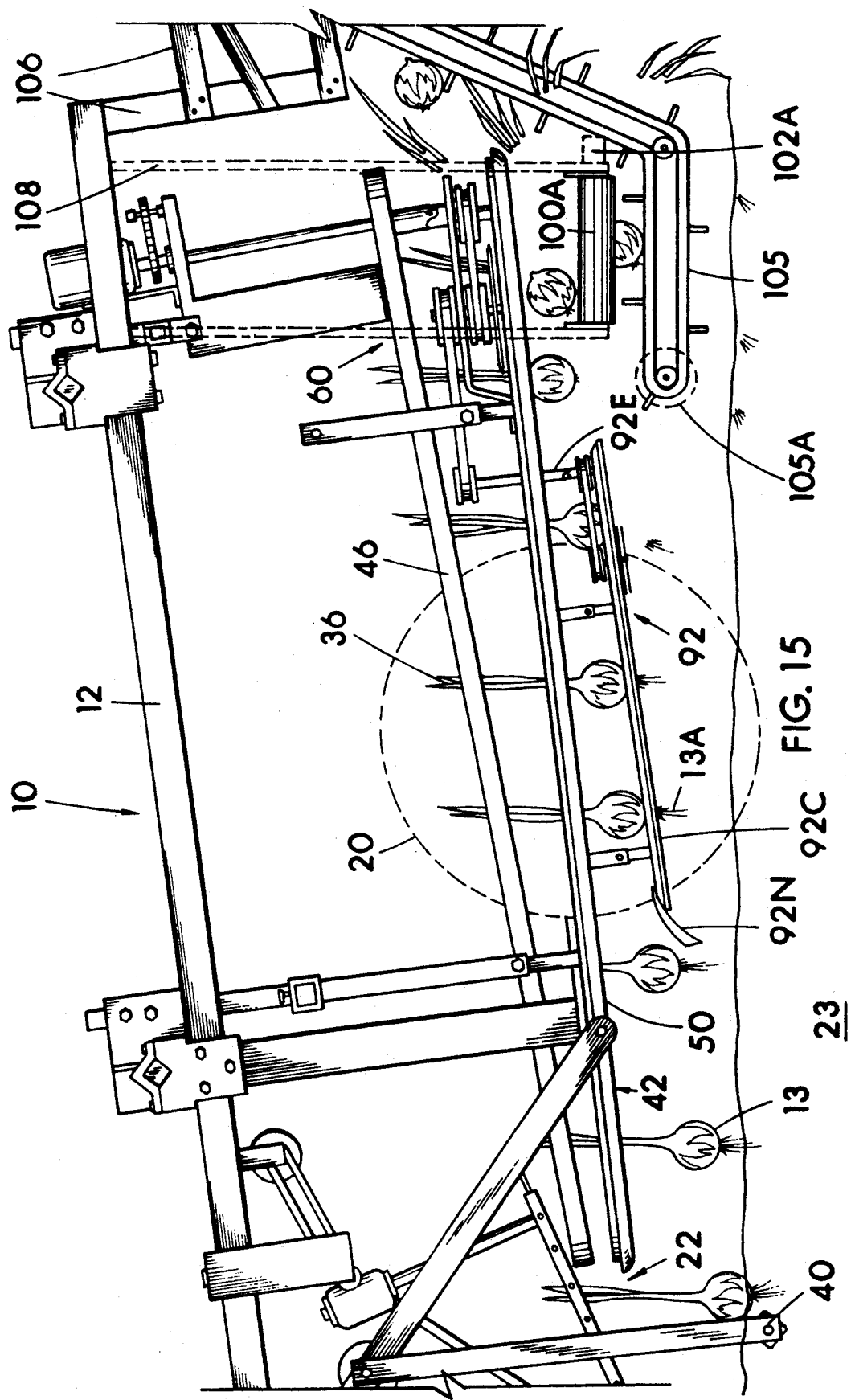
FIG. 15 is a side view of the first embodiment of my harvester, and additionally shown in this view is an optional structural arrangement for cutting-off the small roots on the bottoms of the onions (bulbs), and also showing part of the optional conveyors and boxing arrangement at the rear end of the harvester. More of the conveyors and boxing arrangement given for example may be seen in FIG. 17.
Figure 16:
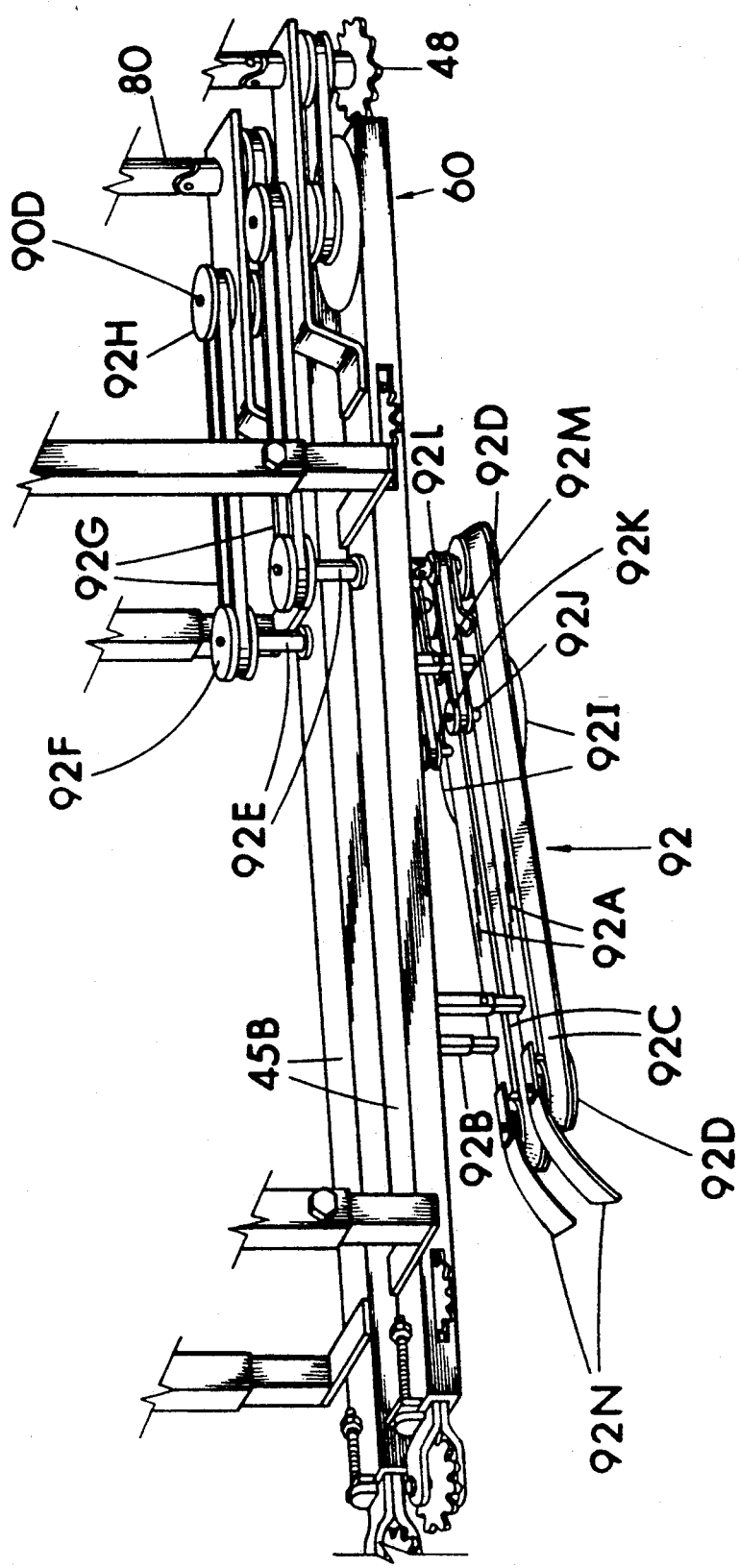
FIG. 16 is a perspective view primarily showing the root cutting arrangement of FIG. 15 from another angle.
Figure 17:
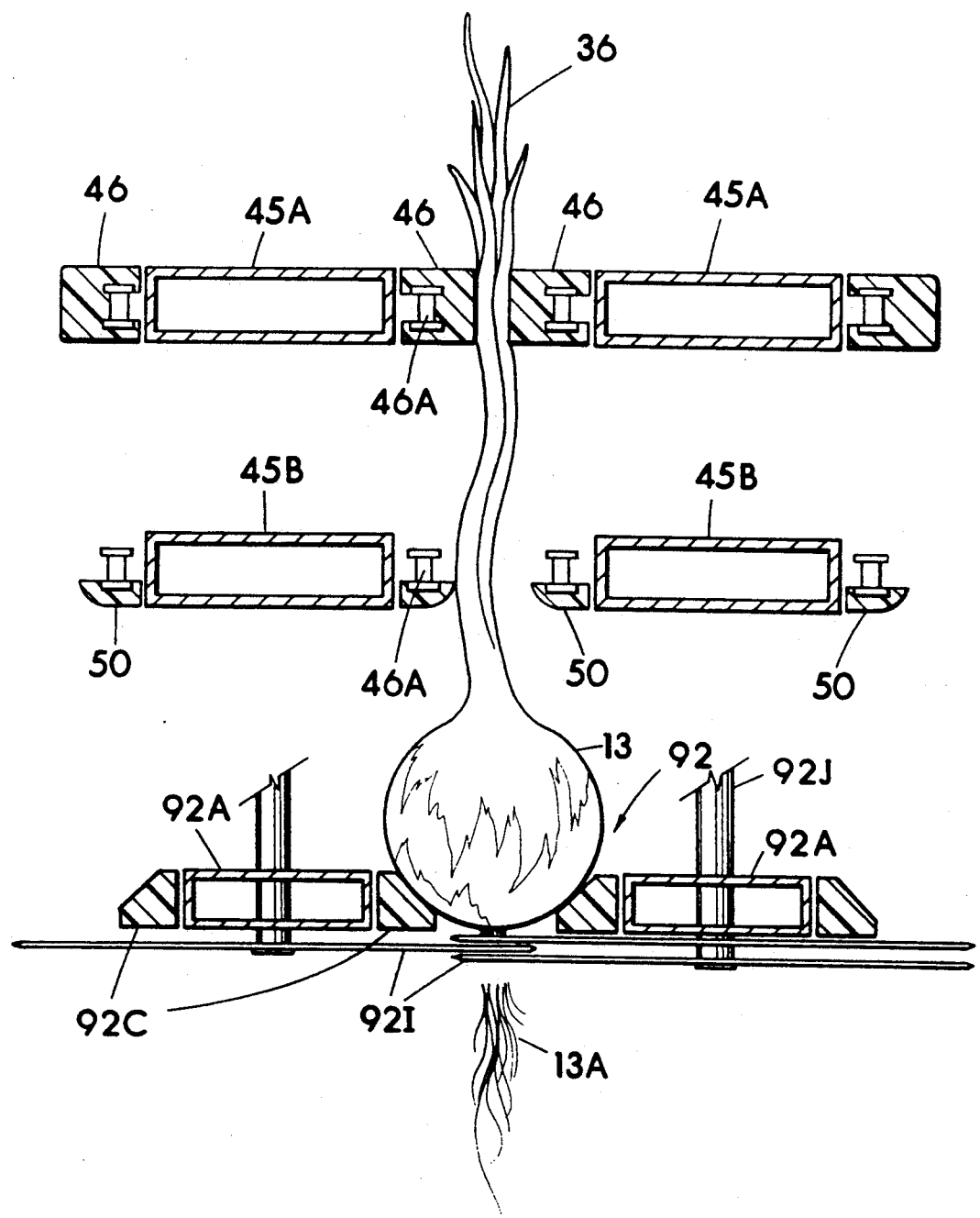
FIG. 17 is an illustrative view taken at cross section line 17 of FIG. 15 showing the foliage of a bulb being pinched in an upper narrow crack between two belt covered chains (belts) at the top, with the foliage loosely positioned in a slightly wider crack between two bulb abutment members (belts) in the middle, and the bottom of the bulb resting on top of two belts and the roots of the bulb having been just cut off by a three cutting blade arrangement positioned at the bottom of the belts on which the bulb is resting.
Figure 18:
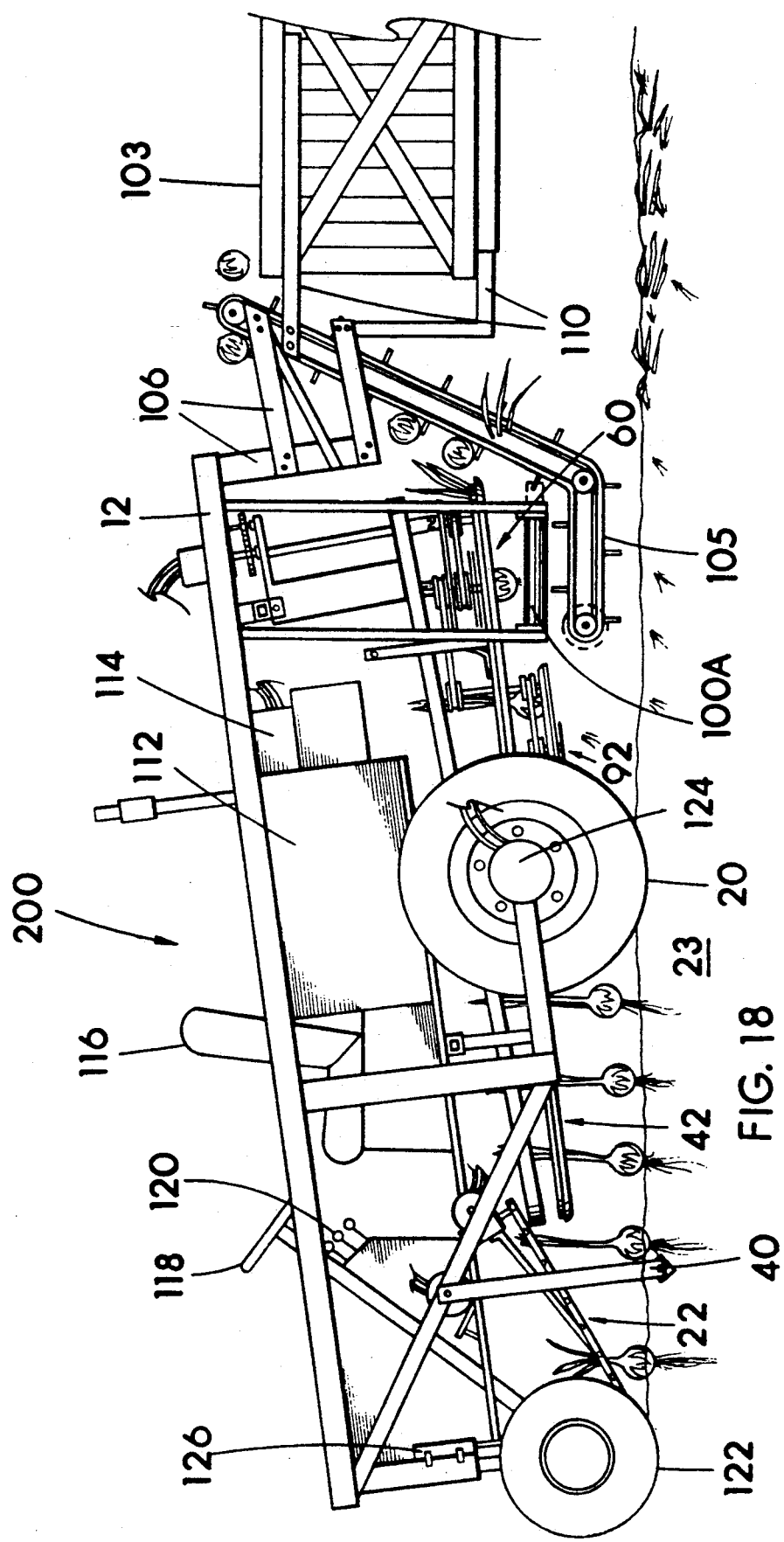
FIG. 18 is a side view of a self-propelled or second embodiment harvester structured in accordance with the present invention and having the optional root cutting arrangement, and conveyors and boxing arrangement attached thereto. This self-propelled embodiment of the harvester is essentially the same as that of the towable first embodiment with the addition of the necessary equipment to this harvester to eliminate the need for the towing tractor. Some of the additional equipment added to this self-propelled embodiment due to the elimination of the tractor include an internal combustion engine and mechanics connected thereto to drive a wheel to propel the harvester along the ground; a steering wheel; a seat for the human driver; additional wheel(s) for increased stability; and a hydraulic fluid pumping system and controls for powering some of the components of the harvester.

Referring now generally to FIGS. 15, 16 and 17 for a description of the optional root outting arrangement designated generally by 92. The term "optional" is used in association with root cutting arrangement 92 since with some types of bulbs, particularly flower bulbs that are going to be shipped and re-planted, it is not desirable to cut off the roots 13A at the bottom of the bulb. In the case of bulb onions which are going to the grocery store, the normal process is to cut off the roots 13A. Root cutting arrangement 92 is positioned below the lower set of belts 50, and is comprised of a set of two rectangular tubes 92A for a single row crop, one tube 92A positioned below each lower tube 45B. Each tube 92A is affixed by two telescopic length adjustable support members 92B. Each support member 92B is attached at the lower end thereof to the top center of a tube 92A and toward one end or the other of the tube 92A as may be seen in FIG. 16. Each support member 92B is attached at the upper end thereof to the bottom center of a lower tube 45B as may be ascertained from FIGS. 16. The telescopic length adjustability of support members 92B allows for positioning tubes 92A closer or further from the ground or bottom of tubes 45B, and support members 92B should be attached by welding or the like to the bottom of tubes 45B at a slight angle toward the rear of the harvester so that tubes 92A are positioned at a divergent angle relative to the ground. The divergent angle of tubes 92A is such that the front end of the tubes 92A which is the closest to foliage lifting structure 22 is closer to the ground than the rear end of the tube 92A which is the end of the tubes 92A closest to the rear end of the harvester (cutting arrangement 60). It should be noted the upper tubes 45A which support belts 46, and the tubes 92A of the root cutter 92 are similarly divergent from the ground, however, tubes 92A and thus the belts supported thereby must elevate or angle more steeply upward toward the rear of the harvester than do upper tubes 45A and belts 46 as will be better understood with continued reading. A small amount of adjustability in the angle of the divergence of tubes 92A is highly desirable, and actually necessary in most cases when adjustments are made to the angles or heights of upper belts 46. A simple way in which to provide the small amount of desired adjustability in the angle of divergence to the ground of tubes 92A is simply to structure support members 92B of at least two telescopic tubes which fit loosely together. The loose fitting together of the two telescopic members will allow "cocking" the inner member at an angle relative to the outer member. A set screw or maybe even two set screws through the outer member of the telescopic arrangement should be used to affix the two telescoped members of support member 92B stationary to one another once the proper angle and length has been accomplished.

Root cutting arrangement 92 is further comprised of loops of rubbery belting 92C, one belting 92C per each tube 92A. Each belt 92C is supported by two rotatably attached pulleys 92D, one pulley 92D attached rotatably at each of the two oppositely disposed ends of each elongated tubes 92A. Each of the pulleys 92D toward the rear end of the harvester is connected to the lower end of a rotatable shaft 92E which has an affixed pulley 92F at the upper end, which in turn is connected by a belt 92G to a pulley 92H which in turn is attached to an extension of shaft 90D of the cutting arrangement 60 as may be ascertained from FIG. 16, and this being an arrangement that when drive shafts 80 rotate, belting 92C rotates in the same direction as drive shaft 80. Shafts 92E additionally should include a universal joint at the lower end thereof in order to help facilitate angular changes in tubes 92A when desired. Root cutting arrangement 92 further comprises rotating cutting blades 92I which may be a three blade arrangement substantially identical to that of the foliage cutting arrangement 60, although other cutting blade arrangements may also work. The rotating cutting blades 92I are rotatably supported by rotatable shafts 92J which are attached to tubes 92A, one shaft 92J per tube 92A, and each shaft 92J includes a pulley 92K at the upper end thereof which is coupled to a pulley 92L on shaft 92E by a belt 92M as may be ascertained from FIG. 16, and this is an arrangement which ultimately couples rotation in drive shaft 80 to cause rotation is cutting blades 92I. Cutting blades 92I are positioned toward the rearward ends of tubes 92A and belts 92C, and further are positioned on the bottom side of the tubes and belts as may be ascertained from FIG. 17. Belts 92C of a "set" of two work together to define a crack between the two belts 92C. At to the front or forward ends of each of the tubes 92A toward foliage lifting arrangement 22 is a downwardly curved plate 92N of smooth metal or plastics to serves as a ramp for bulbs.

The operation of root cutting arrangement 92 is essentially as follows: a bulb is drawn upward from the ground by belts 46 and the bulb lands on top of the rotating belting 92C prior to the bulbs abutting the bottom plane of belts 50. Plates 92N in most cases are not instrumental, but if the bulb is particularly low in its hanging position as it is moved toward belts 92C of the root cutter, the plates 92N provide a smooth ramp surface to guide the bulb up onto belts 92C. Once a bulb is resting on belts 92C, the belts 92C are ideally rotating at the same rate and direction as belts 46 and moving the bulb toward the rear end of the harvester and toward the rotating root cutting blades 92I. The bottom roots 13A of the bulb at this point are dangling downward through the crack defined by the two adjacent or juxtaposed rotating belts 92C, and the bottom edges of the bulb are resting one side edges on each of the two belts 92C which are rotating and functioning cooperatively with one another. Due to the steep upward angle of the belts 92C relative to the less steep upward angle of belts 46 as previously stated, the foliage of the bulb will go slack in most cases, and the slackened foliage assures the proper seating of the bottom of the bulb on the top of the belts 92C. The bulb will come to rest on the belts 92C prior to the roots 13A of the bulb entering the cutting blades 92I where the roots are cut off. The width of the crack defined by the spacing between a set of belts 92C will determine just how far downward the curved bottom of the bulb sits relative to the cutting blades 92I, and thus just how close the roots 13A are cut off relative to the bulb (see FIG. 17). Normally the roots 13A can be left an inch of so long below the bottom of the bulb, and because of this leeway in acceptable length in the cut roots, it is not seen to be critically important to structure the mounting supports for belts 92C in a manner which the width of the crack defined by the belts 92C is adjustable. However, the width of the crack defined by the belts 92C certainly could be made adjustable using similar mounting principles as detailed for adjusting the width of the crack between belts 46 and 50 if desired.

After the roots 13A of the bulb have been cut off, the root cutting arrangement 92 terminates and the bulb drops downward off of the rear end of belts 92C and there is provided sufficient distance between the rearward terminal end of belts 92C and the foliage cutting blades 90A, 90B and 90C so as to allow for the upward slope of belts 46 to draw the bulb up against the bottom plane of the lower belts 50 so that the top of the bulb is properly positioned significantly prior to the bulb with attached foliage entering into the cutting blades which sever the foliage from the bulb.

As may be best ascertained from FIGS. 15 and 18, after the bulb has been severed from the foliage, the bulb drops downward immediately, yet since the belts 46 which pinch the foliage continue rearward beyond the point where the bulb has been cut from the foliage (further rearward of the cutting blade 90A, 90B and 90C) the severed yet still pinched foliage continues to be carried rearward beyond the location at which the bulb has dropped downward. The dropping of the bulb significantly prior to the discarding of the foliage at the rearward most point of belts 46 is useful if it is desired to capture the bulbs for containerizing while dumping the foliage back onto the ground. The capturing of the bulbs before they hit the ground for containerizing them whether in boxes or bags or any other suitable container is almost always preferred, however under some circumstances (fairly rare) it may be desirable to deposit both the separated foliage and bulbs back onto the ground to be picked up in a separate process, and thus the term "optional" has previously been used in association with the conveyors and boxing arrangement. Some onion growers who grow particular varieties of onions do prefer the picked onions to lay on the ground for a short period of time so a small amount of drying and hardening can take place before the onions are placed into containers for movement from the fields.

A description of a possible containerizing arrangement for the bulbs will now ensue primarily with reference to FIGS. 2, 15 and 18. Although there exists several ways in which to capture the falling bulbs after the foliage has been cut therefrom, and the width of the harvester may be significant depending on the number of crop rows the harvester is built to harvest in a single pass, one reasonable structure would be to attached two (transversely positioned) cross conveyor belts 100 and 100A underneath the cutting arrangement(s) 60 so that the bulbs fall onto the rotating cross conveyors 100 and 100A to be carried to the center of the harvester. Cross conveyors 100 and 100A would both be horizontally disposed and would be powered by hydraulic motors 102 and 102A respectively. The belts of conveyors 100 and 100A should be a typical soft rubbery belting to as not to cause bruising to the falling bulbs. Space would be left between the two endward ends of the cross conveyors 100 and 100A, and both cross conveyors 100 and 100A would be rotated so as to carry the bulbs toward the center of the harvester whereat a lifting conveyor 105 would be positioned to receive bulbs falling from both cross conveyors 100 and 100A. Cross conveyors 100 and 100A can be attached to the harvester by vertical support members 108 attached to support frame 12. Lifting conveyor 105 can be attached to the harvester with structural members 106 attached to support frame 12, and may be powered by a hydraulic motor 105A. Lifting conveyor 105 receives the bulb from cross conveyors 100 and 100A, and with rotation of the rubbery belt of lifting conveyor 105 which is preferably of the type of belt having short transverse anti-roll paddles, the bulbs are carried upward and deposited into box 103. Box 103 may be supported above the ground and in alignment with the discharge end of lifting conveyor 105 by a support platform 110 which is attached to conveyor 105 and members 106. The boxing arrangement is seen to be the same as a bagging arrangement as the box 103 shown in FIG. 18 would simply be replaced with a bag having an open top and positioned to receive bulbs from the lifting conveyor 105. The bags would most likely be relatively small compared to the box 103, holding maybe 100 pounds of bulbs or so per bag, and the platform 110 on which box 103 is shown resting would be a work platform from which one or two human workers would stand and replace filled bags with empty bags under conveyor 105. The filled bags could be placed either on the ground for pick-up later, or placed in a trailer towed behind the harvester whether the harvester was towable harvester 10 or self-propelled harvester 200.

The second harvester embodiment 200 shown in FIG. 18 is a self-propelled or second embodiment harvester which as previously stated is also structured in accordance with the present invention and having the optional root cutting arrangement 92, and conveyors and boxing arrangement attached thereto. This self-propelled embodiment of the harvester is essentially the same as that of the towable first embodiment 10 with the addition of the necessary equipment to this harvester embodiment to eliminate the need for the towing tractor. Some of the additional equipment added to this self-propelled embodiment due to the elimination of the tractor include an internal combustion engine 112 and a hydraulic fluid pumping system 114 attached to the engine 112, and controls levers 120 for controlling the on/off and RPM of the engine and hydraulically powered motors and ram 126 of the harvester 200. Harvester 200 additionally includes a hydraulic motor 124 coupled to a wheel 20 so as to be able to apply rotational power to the wheel 20 and move the harvester along the ground. Additionally on harvester 200 are steering mechanics and steering wheel 118; a seat 116 for the human driver adjacent the steering wheel and controls; and one or two additional wheels 122 at the front of the harvester 200 for stability. Harvester 200 also includes a hydraulic ram 126 attached to the front end of the harvester between the wheel(s) 122 and support frame 12 so as to allow the raising and lowering of the harvester essentially to raise the rod weeder 40 out of the ground when desired.

Although I have described my invention sufficiently for those skilled in the art to both make and use at least one structural embodiment of the invention, my descriptions and drawings are for example and illustrative purposes only, and are not intended to limit the scope of the invention to the precise structures shown and described, as those skilled in the art will readily recognize many changes could be made from that shown and describe without departing from the true scope of the invention as depicted in the appended claims.

What I claim as my invention is:

1. An agricultural harvester having a support frame, and having means to allow for movement of said harvester along a ground surface, and further having means to harvest bulbs while moving along the ground, said means to harvest bulbs while moving along the ground including foliage lifting means affixed to said harvester toward a front end of said harvester with said foliage lifting means providing means for lifting foliage attached to bulbs within the ground so as to position the foliage generally vertically oriented above the bulbs and ground for presentation to an elongated rotatable first belt and an elongated rotatable second belt of an upper set of rotatably supported belts affixed to said harvester in juxtaposed relationship to one another so as to define a first receiving crack between said belts, said first receiving crack positioned to receive vertically oriented foliage from said foliage lifting means, said upper set of rotatably supported belts extending from adjacent said foliage lifting means toward a rear end of said harvester, said upper set of rotatably supported belts further being positioned at a divergent angle relative to the ground surface so as to position a rear end of said upper set of rotatably supported belts elevated relative to a front end of said upper set of rotatably supported belts positioned adjacent said foliage lifting means, said first receiving crack being a narrow crack so as to provide means for tightly gripping foliage attached to a bulb which has been received from said foliage lifting means, whereby with rotation of said upper set of rotatably supported belts, gripped foliage with an attached bulb is transported toward said rear end of said harvester with the transporting causing upward drawing of the bulb out of the ground due to said divergent angle of said upper set of rotatably supported belts to the ground, an elongated first member and an elongated second member of a lower set of elongated members affixed to said harvester in juxtaposed relationship to one another so as to define a second receiving crack between said elongated members, said second receiving crack positioned to receive vertically oriented foliage from said foliage lifting means, said lower set of elongated members extending from adjacent said foliage lifting means toward said rear end of said harvester, said lower set of elongated members positioned below said upper set of rotatably supported belts with said first and second receiving cracks positioned generally one above the other so as to allow said first and second receiving cracks to simultaneously possess the foliage of a bulb with the bulb positioned below a bottom plane of said lower set of elongated members, said upper set of rotatably supported belts further being placed at a divergent angle relative to said lower set of elongated members so as to place said upper set of rotatably supported belts closer to said lower set of elongated members near said foliage lifting means and further apart from said lower set of elongated members toward said rear end of said harvester, said bottom plane of said lower set of elongated members providing an abutment surface for a bulb to abut against when drawn upward from the ground by said divergent angle of said upper set of rotatably supported belts so as to position the bulb prior to the bulb with attached foliage being presented to a cutting means affixed to said harvester for cutting foliage from a bulb, said cutting means affixed toward said rear end of said harvester and positioned in close proximity to said lower set of elongated members, said cutting means further positioned to span at least in-part across said second receiving crack so as to be able to cut the foliage from a bulb when the foliage is gripped in said first receiving crack and the bulb is abutted against said bottom plane of said lower set of elongated members.

2. An agricultural harvester according to claim 1 wherein said means to allow for movement of said harvester along a ground surface includes rotatable wheels and a tow hitch attached to said support frame to allow said harvester to be towed by a tractor along a ground surface.

3. An agricultural harvester according to claim wherein said means to allow for movement of said harvester along a ground surface includes rotatable wheels attached to said support frame and an internal combustion engine attached to said harvester to provide means for self-propulsion along a ground surface.

4. An agricultural harvester according to claim 1 in which said lower set of elongated members are adjustably affixed to said harvester to provide means for adjusting said second receiving crack in width; and said upper set of rotatably supported belts are adjustably affixed at said divergent angle relative to the ground surface so as to allow the angle of divergence to the ground to be altered.

5. An agricultural harvester according to claim 4 in which said cutting means includes at least a first rotatable cutting wheel, a second rotatable cutting wheel, and a third rotatable cutting wheel, said first and second cutting wheels stacked one above the other on a first support shaft and positioned in spaced apart relationship to one another on said first support shaft, said third cutting wheel supported by a second support shaft, said first and said second support shafts positioned in spaced apart relationship to one another, said third cutting wheel positioned in-part extending into a narrow space between said first and second cutting wheels, said first, second and third cutting wheels further positioned to span at least in-part across said second receiving crack so as to be able to cut the foliage from a bulb when the foliage is gripped in said first receiving crack and the bulb is abutted against said bottom plane of said lower set of elongated members.

6. An agricultural harvester according to claim 4 in which said foliage lifting means includes two elongated rotatable loop members affixed in juxtaposed relationship to one another and positioned at a divergent angle relative to the ground wherein a front end of said two elongated rotatable loop members is positioned closer to the ground than a rear end of said two elongated rotatable loop members, said rear end of said two elongated rotatable loop members being positioned adjacent said upper set of rotatably supported belts and said lower set of elongated members, said two elongated rotatable loop members of said foliage lifting means further including extending rubbery members;

said harvester further including a rotatable bar affixed to said harvester adjacent said front end of said harvester and positioned generally underneath said foliage lifting means, said rotatable bar positionable below ground level and below bulbs within the ground during harvesting, said rotatable bar providing ground loosening means during harvesting for loosening the ground prior to the bulbs being drawn from the ground, and;

said harvester further including said elongated rotatable first belt and said elongated rotatable second belt of said upper set of rotatably supported belts being comprised of metal chains having rubbery material affixed to said chains so as to provide rubbery surfaces for gripping foliage within said first receiving crack.

7. An agricultural harvester according to claim 6 further including root cutting means affixed to said harvester below said lower set of elongated members, said root cutting means providing means for cutting roots from bulbs;

said harvester further including a bulb catching and containing means for catching bulbs after said cutting means has cut the foliage from the bulbs and after said root cutting means has cut the roots from the bulbs, said bulb catching and containing means further providing means for placing bulbs into a container.

8. An agricultural harvester having a support frame with attached wheels, and having means to allow for movement of said harvester along a ground surface, and further having means to harvest bulbs while moving along the ground, said means to harvest bulbs while moving along the ground including foliage lifting means affixed to said harvester toward a front end of said harvester with said foliage lifting means providing means for lifting foliage attached to bulbs within the ground so as to position the foliage generally vertically oriented above the bulbs and ground for presentation to an elongated rotatable first belt and an elongated rotatable second belt of an upper set of rotatably supported belts affixed to said harvester in juxtaposed relationship to one another so as to define a first receiving crack between said belts, said first receiving crack positioned to receive vertically oriented foliage from said foliage lifting means, said upper set of rotatably supported belts extending from adjacent said foliage lifting means toward a rear end of said harvester, said upper set of rotatably supported belts further being positioned at a divergent angle relative to the ground surface so as to position a rear end of said upper set of rotatably supported belts elevated relative to a front end of said upper set of rotatably supported belts positioned adjacent said foliage lifting means, said first receiving crack being a narrow crack so as to provide means for tightly gripping foliage attached to a bulb which has been received from said foliage lifting means, whereby with rotation of said upper set of rotatably supported belts, gripped foliage with an attached bulb is transported toward said rear end of said harvester with the transporting causing upward drawing of the bulb out of the ground due to said divergent angle of said upper set of rotatably supported belts to the ground, an elongated rotatable first belt and an elongated rotatable second belt of a lower set of rotatably supported belts affixed to said harvester in juxtaposed relationship to one another so as to define a second receiving crack positioned to receive vertically oriented foliage from said foliage lifting means, said lower set of rotatably supported belts extending from adjacent said foliage lifting means toward said rear end of said harvester, said lower set of rotatably supported belts positioned below said upper set of rotatably supported belts with said first and second receiving cracks positioned generally one above the other so as to allow said first and second receiving cracks to simultaneously possess the foliage of a bulb with the bulb positioned below a bottom plane of said lower set of rotatably supported belts, said upper set of rotatably supported belts further being placed at a divergent angle relative to said lower set of rotatably supported belts so as to place said upper set of rotatably supported belts closer to said lower set of rotatably supported belts near said foliage lifting means and further apart from said lower set of rotatably supported belts toward said rear end of said harvester, said bottom plane of said lower set of rotatably supported belts providing an abutment surface for a bulb to abut against when drawn upward from the ground by said divergent angle of said upper set of rotatably supported belts so as to position the bulb prior to the bulb with attached foliage being presented to a cutting means affixed to said harvester for cutting foliage from a bulb, said cutting means affixed toward said rear end of said harvester and positioned in close proximity to said lower set of rotatably supported belts, said cutting means further positioned to span across said second receiving crack so as to be able to cut the foliage from a bulb when the foliage is gripped in said first receiving crack and the bulb is abutted against said bottom plane of said lower set of rotatably supported belts.

9. An agricultural harvester according to claim 8 wherein said means to allow for movement of said harvester along a ground surface includes a tow hitch attached to said support frame to allow said harvester to be towed by a tractor along a ground surface.

10. An agricultural harvester according to claim 8 wherein said means to allow for movement of said harvester along a ground surface includes an internal combustion engine attached to said harvester to provide means for self-propulsion along a ground surface.

11. An agricultural harvester according to claim 8 in which said lower set of rotatably supported belts are adjustably affixed to said harvester to provide means for adjusting said second receiving crack in width so as to allow for the abutment of various sizes of bulbs; and said upper set of rotatably supported belts are adjustably affixed at said divergent angle relative to the ground surface so as to allow the angle of divergence to the ground to be altered.

12. An agricultural harvester according to claim 11 in which said cutting means includes at least a first rotatable cutting wheel, a second rotatable cutting wheel, and a third rotatable cutting wheel, said first and second cutting wheels stacked one above the other on a first support shaft and positioned in spaced apart relationship to one another on said first support shaft, said third cutting wheel supported by a second support shaft, said first and said second support shafts positioned in spaced apart relationship to one another, said third cutting wheel positioned in-part extending into a narrow space between said first and second cutting wheels, said first, second and third cutting wheels further positioned to span at least in-part across said second receiving crack so as to be able to cut the foliage from a bulb when the foliage is gripped in said first receiving crack and the bulb is abutted against said bottom plane of said lower set of rotatably supported belts.

13. An agricultural harvester according to claim I in which said foliage lifting means includes two elongated rotatable loop members affixed in juxtaposed relationship to one another and positioned at a divergent angle relative to the ground wherein a front end of said two elongated rotatable loop members is positioned closer to the ground than a rear end of said two elongated rotatable loop members, said rear end of said two elongated rotatable loop members being positioned adjacent said upper set of rotatably supported belts and said lower set of rotatably supported belts, said two elongated rotatable loop members of said foliage lifting means further including extending rubbery members;

said harvester further including said elongated rotatable first belt and said elongated rotatable second belt of said upper set of rotatably supported belts being comprised of metal chains having rubbery material affixed to said chains so as to provide rubbery surfaces for gripping foliage within said first receiving crack.

14. An agricultural harvester according to claim 13 further including a rotatable bar affixed to said harvester adjacent said front end of said harvester and positioned generally underneath said foliage lifting means, said rotatable bar positionable below ground level and below bulbs within the ground during harvesting, said rotatable bar providing ground loosening means during harvesting for loosening the ground prior to the bulbs being lifted from the ground;

said harvester further including root cutting means affixed to said harvester below said lower set of rotatably supported belts, said root cutting means providing means for cutting roots from bulbs;

said harvester further including a bulb catching and containing means for catching bulbs after said cutting means has cut the foliage from the bulbs and after said root cutting means has cut the roots from the bulbs, said bulb catching and containing means further providing means for placing bulbs into a container.

15. An agricultural harvester having a support frame with attached wheels, and having means to allow for movement of said harvester along a ground surface, and further having means to harvest bulbs while moving along the ground, said means to harvest bulbs while moving along the ground including foliage lifting means affixed to said harvester toward a front end of said harvester, said foliage lifting means including two elongated rotatable loop members affixed in juxtaposed relationship to one another and positioned at a divergent angle relative to the ground wherein a front end of said two elongated rotatable loop members is positioned closer to the ground than a rear end of said two elongated rotatable loop members, said two elongated rotatable loop members of said foliage lifting means further including extending rubbery members, said foliage lifting means providing means for lifting foliage attached to bulbs within the ground so as to position the foliage generally vertically oriented above the bulbs and ground for presentation to an elongated rotatable first belt and an elongated rotatable second belt of an upper set of rotatably supported belts affixed to said harvester in juxtaposed relationship to one another so as to define a first receiving crack between said belts, said first receiving crack positioned to receive vertically oriented foliage from said foliage lifting means, said upper set of rotatably supported belts extending from adjacent said foliage lifting means toward a rear end of said harvester, said upper set of rotatably supported belts further being positioned at a divergent angle relative to the ground surface so as to position a rear end of said upper set of rotatably supported belts elevated relative to a front end of said upper set of rotatably supported belts positioned adjacent said foliage lifting means, said first receiving crack being a narrow crack so as to provide means for tightly gripping foliage attached to a bulb which has been received from said foliage lifting means, whereby with rotation of said upper set of rotatably supported belts, gripped foliage with an attached bulb is transported toward said rear end of said harvester with the transporting causing upward drawing of the bulb out of the ground due to said divergent angle of said upper set of rotatably supported belts to the ground, an elongated rotatable first belt and an elongated rotatable second belt of a lower set of rotatably supported belts affixed to said harvester in juxtaposed relationship to one another so as to define a second receiving crack positioned to receive vertically oriented foliage from said foliage lifting means, said lower set of rotatably supported belts extending from adjacent said foliage lifting means toward said rear end of said harvester, said lower set of rotatably supported belts positioned below said upper set of rotatably supported belts with said first and second receiving cracks positioned generally one above the other so as to allow said first and second receiving cracks to simultaneously possess the foliage of a bulb with the bulb positioned below a bottom plane of said lower set of rotatably supported belts, said upper set of rotatably supported belts further being placed at a divergent angle relative to said lower set of rotatably supported belts so as to place said upper set of rotatably supported belts closer to said lower set of rotatably supported belts near said foliage lifting means and further apart from said lower set of rotatably supported belts toward said rear end of said harvester, said bottom plane of said lower set of rotatably supported belts providing an abutment surface for a bulb to abut against when drawn upward from the ground by said divergent angle of said upper set of rotatably supported belts so as to position the bulb prior to the bulb with attached foliage being presented to a cutting means affixed to said harvester for cutting foliage from a bulb, said cutting means affixed toward said rear end of said harvester and positioned in close proximity to said lower set of rotatably supported belts, said cutting means comprising at least a first rotatable cutting wheel, a second rotatable cutting wheel, and a third rotatable cutting wheel, said first and second cutting wheels stacked one above the other on a first support shaft and positioned in spaced apart relationship to one another on said first support shaft, said third cutting wheel supported by a second support shaft, said first and said second support shafts positioned in spaced apart relationship to one another, said third cutting wheel positioned in-part extending into a narrow space between said first and second cutting wheels, said first, second and third cutting wheels further positioned to span at least in-part across said second receiving crack so as to be able to cut the foliage from a bulb when the foliage is gripped in said first receiving crack and the bulb is abutted against said bottom plane of said lower set of rotatably supported belts.

16. An agricultural harvester according to claim 15 wherein said means to allow for movement of said harvester along a ground surface includes a tow hitch to allow said harvester to be towed by a tractor along a ground surface.

17. An agricultural harvester according to claim 15 wherein said means to allow for movement of said harvester along a ground surface includes an internal combustion engine attached to said harvester to provide means for self-propulsion along a ground surface.

18. An agricultural harvester according to claim 15 in which said lower set of rotatably supported belts are adjustably affixed to said harvester to provide means for adjusting said second receiving crack in width so as to allow for the abutment of various sizes of bulbs; and said upper set of rotatably supported belts are adjustably affixed at said divergent angle relative to the ground surface so as to allow the angle of divergence to the ground to be altered.

19. An agricultural harvester according to claim 18 further including a rotatable bar affixed to said harvester adjacent said front end of said harvester and positioned generally underneath said foliage lifting means, said rotatable bar positionable below ground level and below bulbs within the ground during harvesting, said rotatable bar providing ground loosening means during harvesting for loosening the ground prior to the bulbs being lifted from the ground;

said harvester further including root cutting means affixed to said harvester below said lower set of rotatably supported belts, said root cutting means providing means for cutting roots from bulbs;

said harvester further including a bulb catching and containing means for catching bulbs after said cutting means has cut the foliage from the bulbs and after said root cutting means has cut the roots from the bulbs, said bulb catching and containing means further providing means for placing bulbs into a container.

20. An agricultural harvester according to claim 19 in which said elongated rotatable first belt and said elongated rotatable second belt of said upper set of rotatably supported belts are comprised of metal chains having rubbery material affixed to said chains so as to provide rubbery surfaces for gripping foliage within said first receiving crack.

* * * * *